United States Patent
Honorio Araujo da Silva et al.

(10) Patent No.: US 12,261,932 B2
(45) Date of Patent: Mar. 25, 2025

(54) METHODS AND SYSTEMS FOR PUBLIC AND PRIVATE-KEY LEVELED FULLY HOMOMORPHIC ENCRYPTION WITHOUT BOOTSTRAPPING WITH HENSEL CODES

(71) Applicant: Algemetric, LLC, Colorado Springs, CO (US)

(72) Inventors: David W. Honorio Araujo da Silva, Colorado Springs, CO (US); Carlos A. Paz de Araujo, Colorado Springs, CO (US); Jordan Isabella Pattee, Colorado Springs, CO (US)

(73) Assignee: Algemetric, Inc., Colorado Springs, CO (US)

( * ) Notice: Subject to any disclaimer, the term of this patent is extended or adjusted under 35 U.S.C. 154(b) by 360 days.

(21) Appl. No.: 17/676,096

(22) Filed: Feb. 18, 2022

(65) Prior Publication Data

US 2022/0385448 A1    Dec. 1, 2022

Related U.S. Application Data

(60) Provisional application No. 63/150,884, filed on Feb. 18, 2021.

(51) Int. Cl.
*H04L 9/00*    (2022.01)
*H04L 9/14*    (2006.01)

(52) U.S. Cl.
CPC ............... *H04L 9/008* (2013.01); *H04L 9/14* (2013.01)

(58) Field of Classification Search
CPC .................................. H04L 9/008; H04L 9/14
See application file for complete search history.

(56) References Cited

U.S. PATENT DOCUMENTS

2021/0036849 A1*  2/2021  Honorio Araujo da Silva ............ H04L 9/3066

OTHER PUBLICATIONS

Da Silva et al, "An Efficient Homomorphic Data Encoding with Multiple Secret Hensel Codes", 2020 (Year: 2020).*

* cited by examiner

*Primary Examiner* — Kevin Bechtel
*Assistant Examiner* — Forrest L Carey
(74) *Attorney, Agent, or Firm* — Christopher P. Whitham; Cochran Freund & Young LLC

(57) ABSTRACT

Disclosed are methods and systems to provide public and private-key leveled Fully Homomorphic Encryption (FHE) systems using Hensel Codes and p-adic and g-adic properties for encryption and decryption that also provide for homomorphic arithmetic operations on encrypted ciphertexts. A source device may encrypt the ciphertext of a message using Hensel Codes, then deliver the ciphertext to either a destination device or an intermediary device. When the intermediary device receives the ciphertext from the source device, the intermediary device may homomorphically perform Hensel Code arithmetic computations with the ciphertext and at least one additional ciphertext and send the result ciphertext to the destination device. The destination device decrypts the ciphertext, giving the original message when no computations have been performed by the intermediary device, or the unencrypted result equivalent to the unencrypted computations performed on the ciphertexts by the intermediary device.

8 Claims, 3 Drawing Sheets

100 BLOCK DIAGRAM OF HARDWARE IMPLEMENTATION FOR A PRIVATE OR PUBLIC-KEY EMBODIMENT

METHODS AND SYSTEMS FOR PUBLIC AND PRIVATE-KEY LEVELED FULLY HOMOMORPHIC ENCRYPTION WITHOUT BOOTSTRAPPING WITH HENSEL CODES

CROSS REFERENCE TO RELATED APPLICATIONS

This application is based upon and claims the benefit of U.S. provisional application Ser. No. 63/150,884, filed Feb. 18, 2021, entitled "Private-Key Leveled Fully Homomorphic Encryption Without Bootstrapping With Hensel Codes," all of which is also specifically incorporated herein by reference for all that it discloses and teaches.

BACKGROUND OF THE INVENTION

The advancement of science is possible when knowledge is shared and information is exchanged in a seamless manner. In a world where many businesses rely on information as their main assets, analysis over data is a crucial competitive advantage. Consequently, the amount of data processed and stored will continue to increase, creating a demand for virtualized services. To this end, some applications can be provided as cloud computing resources including Internet of Things (IoT), machine learning, virtual reality (VR) and blockchain. As a result, concerns about custody and privacy of data are on the rise.

Modern concealment/encryption employs mathematical techniques that manipulate positive integers or binary bits. Asymmetric concealment/encryption, such as RSA (Rivest-Shamir-Adleman), relies on number theoretic one-way functions that are predictably difficult to factor and can be made more difficult with an ever-increasing size of the encryption keys. Symmetric encryption, such as DES (Data Encryption Standard) and AES (Advanced Encryption Standard), uses bit manipulations within registers to shuffle the concealed text/cryptotext to increase "diffusion" as well as register-based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext) data, thus, making it difficult to discover the encryption key of the concealment/encryption process by spreading the influence of each piece of the unencrypted (plain) data across several pieces of the concealed/encrypted (cryptotext) data. Consequently, an encryption system that has a high degree of diffusion will typically change several characters of the concealed/encrypted (cryptotext) data for the change of a single character in the unencrypted (plain) data making it difficult for an attacker to identify changes in the unencrypted (plain) data. Confusion is generally thought of as obscuring the relationship between the unencrypted (plain) data and the concealed/encrypted (cryptotext) data. Accordingly, a concealment/encryption system that has a high degree of confusion would entail a process that drastically changes the unencrypted (plain) data into the concealed/encrypted (cryptotext) data in a way that, even when an attacker knows the operation of the concealment/encryption method (such as the public standards of RSA, DES, and/or AES), it is still difficult to deduce the encryption key.

Homomorphic Encryption is a form of encryption that allows computations to be carried out on concealed cipher text as it is concealed/encrypted without decrypting the cipher text that generates a concealed/encrypted result which, when decrypted, matches the result of operations performed on the unencrypted plaintext.

The word homomorphism comes from the ancient Greek language: ὁμό (homos) meaning "same" and μορφή (morphe) meaning "form" or "shape." Homomorphism may have different definitions depending on the field of use. In mathematics, for example, homomorphism may be considered a transformation of a first set into a second set where the relationship between the elements of the first set are preserved in the relationship of the elements of the second set.

For instance, a map f between sets A and B is a homomorphism of A into B if $$f(a_1 \text{ op } a_2) = f(a_1) \text{ op } f(a_2) | a_1, a_2 \in A$$

where "op" is the respective group operation defining the relationship between A and B.

More specifically, for abstract algebra, the term homomorphism may be a structure-preserving map between two algebraic structures such as groups, rings, or vector spaces. Isomorphisms, automorphisms, and endomorphisms are typically considered special types of homomorphisms. Among other more specific definitions of homomorphism, algebra homomorphism may be considered a homomorphism that preserves the algebra structure between two sets.

SUMMARY OF THE INVENTION

An embodiment of the present invention may comprise a method for private-key Fully Homomorphic Encryption (FHE) communication of a message m between a source computing device and a destination computing device, the method comprising: generating by the source computing device prime numbers $p_1 \ldots p_5$ as a function of provided parameters $\lambda$ and d; setting by the source computing device a secret key sk to be comprised of the prime numbers $p_1 \ldots p_5$ wherein the secret key is known to both of the source computing device and the destination computing device but not to other computing devices; setting by the source computing device a public evaluation key evk to be equal to a product $(\Pi_{i=1}^{5} p_i)$ of the prime numbers $p_1 \ldots p_5$ wherein the evk also equals a g of Hensel Code g-adic computations $(H_g)$; generating by the source computing device values $s_1, s_2, s_3$, and $\delta$ as a function of the prime numbers $p_2 \ldots p_4$, the parameter $\lambda$, and the value g; encrypting by the source computing device the message m as ciphertext c in accord with Hensel Code encryption computation $c = |H_g(s_1 \cdot \tilde{H}_{p_1,p_2,p_3}^{-1}(0, s_2, s_3) + \delta p_4)|_g$; sending by the source computing device the ciphertext c to the destination computing device; decrypting by the destination computing device the ciphertext c back into the message m in accord with Hensel Code decryption computation $m = H_{p_1}^{-1}(H_{p_1}(H_{p_4}^{-1}(c)))$.

An embodiment of the present invention may further comprise the method of the preceding paragraph: wherein the process of sending by the source computing device the ciphertext c to the destination computing device instead sends the ciphertext c to an intermediary computing device; wherein the intermediary computing device does not have knowledge of the secret key sk, but does have knowledge of the public evaluation key evk that equals the g of the Hensel Code g-adic computations $(H_g)$; wherein the method of claim 1 further comprises: homomorphically computing by the intermediary computing device at least one arithmetic function with the ciphertext c and at least one additional ciphertext $c_{additional}$ in accord with Hensel Code arithmetic functions over integers modulo g to obtain a result ciphertext $c_{result}$; and sending by the intermediary computing device the result ciphertext $c_{result}$ in place of the ciphertext c to the destination computing device; and wherein the process of decrypting by the destination computing device the ciphertext c back into the message m instead decrypts the ciphertext $c_{result}$ to obtain a result r equal to an unencrypted computation of the arithmetic functions homomorphically performed as the Hensel code arithmetic functions with the ciphertext c and the at least one additional ciphertext $c_{additional}$.

An embodiment of the present invention may further comprise a method for public-key Fully Homomorphic Encryption (FHE) communication of a message m between a source computing device and a destination computing device, the method comprising: generating by the source computing device prime numbers $p_1$, $p_2$, $p_3$, and $p'_4$ as a function of provided parameters $\lambda$ and d; computing by the source computing device a value $p_4$ as a function of the prime number $p'_4$ and the parameters $\lambda$ and d; setting by the source computing device a value g of Hensel Code g-adic computations ($H_g$) to a product of the values $p_1$, $p_2$, $p_3$, $p_4$ and a value g' of Hensel Code g'-adic computations ($H_{g'}$) to a product of the values $p_3$, $p_4$; generating by the source computing device values t and $\delta_e$ as a function of the parameters $\lambda$ and d; computing by the source computing device a value e in accord with Hensel Code value e computation $e = H_g(H_{p_3}(\tilde{H}_{p_1 p_2}^{-1}(0, t)) + \delta_e p_3)$; setting by the source computing device a secret key sk to be comprised of the prime numbers $p_1$ and $p_3$ wherein the secret key sk is known to both of the source computing device and the destination computing device but not to other computing devices; setting by the source computing device a public key pk to be comprised of the values e, g', g=evk; generating by the source computing device values $s_1$, $s_2$ as a function of the parameter $\lambda$, and a value $\delta$ as a function of the values $p_1$, $p_2$, $p_4$; encrypting by the source computing device the message m as ciphertext c in accord with Hensel Code encryption computation $c = H_g(H_g(s_1 e + m) + s_2 g' + \delta(g')^2)$; sending by the source computing device the ciphertext c to the destination computing device; decrypting by the destination computing device the ciphertext c back into the message m in accord with Hensel Code decryption computation $m = H_{p_1}^{-1}(H_{p_1}(H_{p_3}^{-1}(c)))$.

An embodiment of the present invention may further comprise the method the preceding paragraph: wherein the process of sending by the source computing device the ciphertext c to the destination computing device instead sends the ciphertext c to an intermediary computing device; wherein the intermediary computing device does not have knowledge of the secret key sk, but does have knowledge of the public key pk that includes the g of the Hensel Code g-adic computations ($H_g$); wherein the method of claim 4 further comprises: homomorphically computing by the intermediary computing device at least one arithmetic function with the ciphertext c at least one additional ciphertext $c_{additional}$ in accord with Hensel Code arithmetic functions over integers modulo g to obtain a result ciphertext $c_{result}$; and sending by the intermediary computing device the result ciphertext $c_{result}$ in place of the ciphertext c to the destination computing device; and wherein the process of decrypting by the destination computing device the ciphertext c back into the message m instead decrypts the ciphertext $c_{result}$ to obtain a result r equal to an unencrypted computation of the arithmetic functions homomorphically performed as the Hensel code arithmetic functions with the ciphertext c and the at least one additional ciphertext $c_{additional}$.

An embodiment of the present invention may further comprise a private-key leveled Fully Homomorphic Encryption (FHE) system that communicates a message m between a source computing device and a destination computing device, the private-key leveled FHE system comprising: the source computing device, wherein the source device further comprises: a Gen subsystem that generates device prime numbers $p_1 \ldots p_5$ as a function of provided parameters $\lambda$ and d, sets a secret key sk to be comprised of the prime numbers $p_1 \ldots p_5$ wherein the secret key is known to both of the source computing device and the destination computing device but not to other computing devices, sets a public evaluation key evk to be equal to a product $(\Pi_{i=1}^5 p_i)$ of the prime numbers $p_1 \ldots p_5$ wherein the evk also equals a g of Hensel Code g-adic computations ($H_g$); an Enc subsystem that generates device values $s_1$, $s_2$, $s_3$, and $\delta$ as a function of the prime numbers $p_2 \ldots p_4$, the parameter $\lambda$, and the value g, encrypts the message m as ciphertext c in accord with Hensel Code encryption computation $c = |H_g(s_1 \cdot \tilde{H}_{p_1 p_2 p_3}^{-1}(0, s_2, s_3) + \delta p_4)|_g$; a ciphertext send subsystem that sends the ciphertext c to the destination computing device; and the destination computing device, wherein the destination computing device further comprises: a Dec subsystem that decrypts the ciphertext c back into the message m in accord with Hensel Code decryption computation $m = H_{p_1}^{-1}(H_{p_1}(H_{p_4}^{-1}(c)))$.

An embodiment of the present invention may further comprise the private-key leveled FHE system of preceding paragraph: wherein the ciphertext send subsystem sends the ciphertext c to an intermediary computing device; wherein the intermediary computing device does not have knowledge of the secret key sk, but does have knowledge of the public evaluation key evk that equals the g of the Hensel Code g-adic computations ($H_g$); wherein the private-key leveled FHE system of the preceding paragraph further comprises: an Eval subsystem that homomorphically computes at least one arithmetic function with the ciphertext c and at least one additional ciphertext $c_{additional}$ in accord with Hensel Code arithmetic functions over integers modulo g to obtain a result ciphertext $c_{result}$; and a result ciphertext send subsystem that sends the result ciphertext $c_{result}$ in place of the ciphertext c to the destination computing device; and wherein the Dec subsystem decrypts the ciphertext $c_{result}$ to obtain a result r equal to an unencrypted computation of the arithmetic functions homomorphically performed as the Hensel code arithmetic functions with the ciphertext c and the at least one additional ciphertext $c_{additional}$.

An embodiment of the present invention may further comprise a public-key leveled Fully Homomorphic Encryption (FHE) system that communicates a message m between a source computing device and a destination computing device, the private-key leveled FHE system comprising: the source computing device, wherein the source device further comprises: a Gen subsystem that generates prime numbers $p_1$, $p_2$, $p_3$, and $p'_4$ as a function of provided parameters $\lambda$ and d, computes a value $p_4$ as a function of the prime number $p'_4$ and the parameters $\lambda$ and d, sets a value g of Hensel Code g-adic computations ($H_g$) to a product of the values $p_1$, $p_2$, $p_3$, $p_4$ and a value g' of Hensel Code g'-adic computations ($H_{g'}$) to a product of the values $p_3$, $p_4$, generates values t and $\delta_e$ as a function of the parameters $\lambda$ and d, computes a value e in accord with Hensel Code value e computation $e = H_g(H_{p_3}(\tilde{H}_{p_1 p_2}^{-1}(0, t)) + \delta_e p_3)$, sets a secret key sk to be comprised of the prime numbers $p_1$ and $p_3$ wherein the secret key sk is known to both of the source computing device and the destination computing device but not to other computing devices, and sets a public key pk to be comprised of the values e, g', g=evk; an Enc subsystem that generates values $s_1$, $s_2$ as a function of the parameter $\lambda$, and a value $\delta$ as a function of the values $p_1$, $p_2$, $p_4$, and encrypts the message m as ciphertext c in accord with Hensel Code encryption computation $c=H_g(H_g(s_1 e+m)+s_2 g'+\delta(g')^2)$; a ciphertext send subsystem that sends the ciphertext c to the destination computing device; and the destination computing device, wherein the destination computing device further comprises: a Dec subsystem that decrypts the ciphertext c back into the message m in accord with Hensel Code decryption computation $m=H_{p_1}^{-1}(H_{p_1}(H_{p_3}^{-1}(c)))$.

An embodiment of the present invention may further comprise the public-key leveled FHE system of the preceding paragraph: wherein the ciphertext send subsystem sends the ciphertext c to an intermediary computing device; wherein the intermediary computing device does not have knowledge of the secret key sk, but does have knowledge of the public key pk that includes the g of the Hensel Code g-adic computations ($H_g$) wherein the private-key leveled FHE system of the preceding paragraph further comprises: an Eval subsystem that homomorphically computes at least one arithmetic function with the ciphertext c and at least one additional ciphertext $c_{additional}$ in accord with Hensel Code arithmetic functions over integers modulo g to obtain a result ciphertext $c_{result}$; and a result ciphertext send subsystem that sends the result ciphertext $c_{result}$ in place of the ciphertext c to the destination computing device; and wherein the Dec subsystem decrypts the ciphertext $c_{result}$ to obtain a result r equal to an unencrypted computation of the arithmetic functions homomorphically performed as the Hensel code arithmetic functions with the ciphertext c and the at least one additional ciphertext $c_{additional}$.

DETAILED DESCRIPTION OF THE EMBODIMENTS

Figure 1:
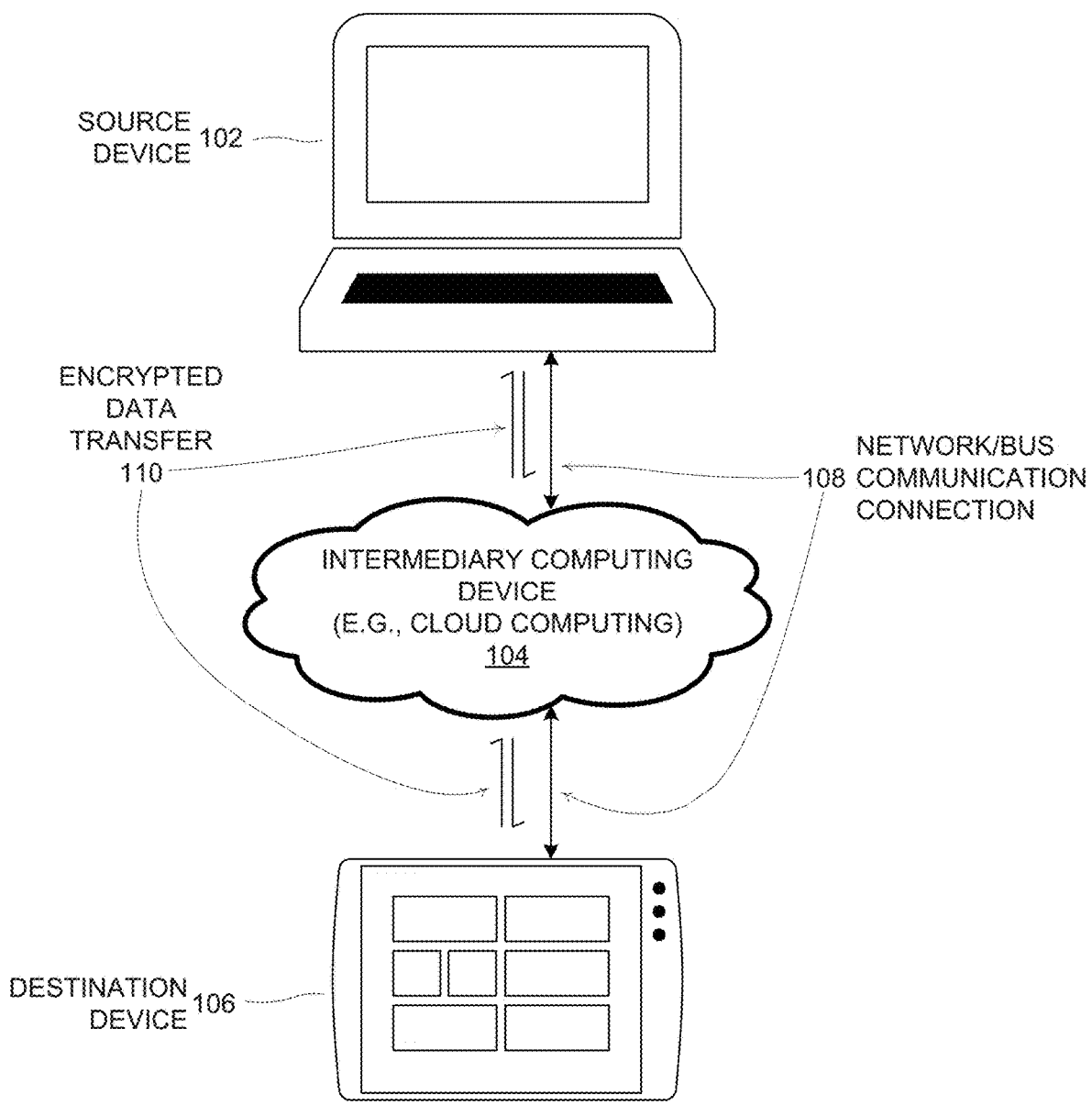
FIG. 1 is a block diagram of the hardware implementation for a private or public-key leveled Fully Homomorphic Encryption (FHE) embodiment.

We propose the use of Hensel codes (a mathematical tool lifted from the theory of p-adic numbers) as an alternative way to construct Fully Homomorphic Encryption (FHE) schemes that rely on the hardness of some instance of the Approximate Greatest Common Divisor (AGCD) problem. We provide a self-contained introduction to Hensel codes which covers all the properties of interest for this work. Two constructions are presented: a private-key leveled FHE scheme and a public-key leveled FHE scheme. The public-key scheme is obtained via minor modifications to the private-key scheme in which we explore asymmetric properties of Hensel codes. The efficiency and security (under an AGCD variant) of the public-key scheme are discussed in detail. Our constructions take messages from large specialized subsets of the rational numbers that admit fractional numerical inputs and associated computations for virtually any real-world application. Further, our results can be seen as a natural unification of error-free computation (computation free of rounding errors over rational numbers) and homomorphic encryption. Experimental results indicate the scheme is practical for a large variety of applications.

1. Introduction

Homomorphic Encryption (HE) is a type of encryption that enables meaningful and general computation over encrypted data. This notion, originally referred to as privacy homomorphisms, was introduced in 1978. Although every single instance of practical homomorphic computation can be interesting in itself, it is clear that the ultimate goal of HE was to enable computation of any circuit. Several constructions provided partial solutions but it was not until 2009 that Craig Gentry proposed the first fully homomorphic encryption (FHE) scheme. Gentry's strategy consisted in first realizing a Somewhat Homomorphic Encryption (SHE) scheme that enables the (homomorphic) evaluation of low-degree multivariate polynomials. Ciphertexts are embodied with noise, which grows slightly over addition and tremendously over multiplication, which compromises the limits of low-degree polynomials. To solve this problem, Gentry introduced a bootstrapping mechanism with which one can transform a SHE scheme that is able to homomorphically evaluate its own decryption function into a leveled FHE scheme, that is, an encryption scheme that is able to evaluate any circuit up to a predefined depth. The bootstrapping technique produces a "fresh" ciphertext: a ciphertext with an amount of noise equivalent to what it was prior to any homomorphic operation.

Only a few SHE schemes are able to evaluate their own decryption function but also FHE schemes that follow Gentry's blueprint suffer from poor performance. To put things into perspective, the complexity of performing bootstrapping is at least the complexity of decryption multiplied by the bit-length of the individual ciphertexts that are used to encrypt the bits of the secret key. In the context of Gentry's blueprint this is necessary since the SWHE evaluates the decryption function using an encrypted secret key and each bit of the secret key is then replaced by a very large ciphertext that encrypts that bit. To address this problem, Brakerski, Gentry, and Vaikuntanathan introduced two schemes (known as BGV) which are conceived via an entirely new approach, with much better performance than Gentry's original blueprint. This new approach consists in skipping the SWHE step and directly constructing leveled FHE schemes with the possibility of using bootstrapping as an optimization. The BGV scheme, as the vast majority of FHE schemes, is latticed-based and its security is based on some version of the learning with errors (LWE) assumption.

Dijk, Gentry, Halevi, and Vaikuntanathan, when introducing the scheme known as DGHV propose an interesting question: "What is the simplest encryption scheme for which one can hope to achieve security?". Naturally, the simple will not always be secure so the reconciliation of simplicity and security is undoubtedly a much desired and sometimes hard-to-achieve property. Compared to any lattice-based FHE scheme, DGHV is significantly simpler: very small description with basic modular arithmetic. Similar to Gentry-like constructions, it encrypts individual bits. Unlike lattice-based schemes (which work with vectors and matrices), it operates over the integers. DGHV's security is based on both the single-source-shortest-paths (SSSP) and the approximate greatest common divisor (AGCD) assumption introduced by Howgrave-Graham. Several other contributions were able to improve DGHV's efficiency.

Could a simpler FHE scheme be as secure as the lattice-based ones? A remarkable result by Cheon and Stehle introduces a reduction from LWE to AGCD which is demonstrated by constructing a FHE scheme with security based on the AGCD assumption by deriving the AGCD parameters from the LWE parameters. Among the similarities between DGHV and the scheme proposed by Cheon and Stehle, we remark two facts: 1) they both encrypt bits and 2) they derive a public-key encryption scheme by first describing a private-key encryption scheme and then converted into its public-key counterpart by applying the method introduced by Rothblum, which is based on the fact that any additively homomorphic private-key encryption scheme that is compact can be converted into a public-key encryption scheme. (Informally, a FHE scheme is compact if the size of ciphertexts output by homomorphic evaluations is independent of the number of ciphertexts and/or operations from which it was created.) The combination of these two facts has, at least, the following implication: if $\gamma$ is the bit length of ciphertexts generated by a FHE scheme with the aforementioned characteristics, for each n-bit message, their corresponding ciphertexts have length $n\gamma$. Since, in that kind of encryption scheme, the public key is a $\tau$-tuple of ciphertexts encrypting n-bit messages, the length of the public-key is $\tau n \gamma$ bits.

1.1 Homomorphic Rational Arithmetic

The need for performing homomorphic operations with rational numbers has been recently investigated. This issue is usually addressed by adding an encoding scheme to the homomorphic encryption scheme so rational numbers can be encoded to, typically, polynomials over some ring. A clever solution was proposed where a technique proposed by Hoffstein and Silverman is combined with the Fan-Vercauteren homomorphic encryption scheme, so a new encryption scheme is derived where rational numbers can be encoded and then used as input. Another interesting solution was proposed where rational numbers are thought as continued fractions and then represented as a sequence of integers. It is not surprising, due to its simplicity, that some form of modular arithmetic is used to encode rational numbers for carrying computation over the integers. Our contribution, at the very least, is distinct in the fact that the encoding of rational numbers into integers is the encryption function itself. Thus, we do not follow the blueprint of using a scheme for encoding rational numbers and another scheme for encrypting and evaluating homomorphic operations. Instead, Hensel codes are employed for both encoding and encryption. Another advantage of our constructions is that we show how to probabilistically encode rational numbers in a structure-preserving way so other homomorphic encryption schemes can use our encoding for performing rational arithmetic.

1.2 Our Contribution

Would it be possible to describe a leveled FHE scheme that conveniently evaluates ciphertexts over the integers and at the same time has a better ciphertext expansion? Would it be possible to work with a public key with length smaller than the length of corresponding ciphertexts? Furthermore, what if we wanted to further expand the message space from bits to not only large integers but also large (positive and negative) rational numbers? Properly expanding the message space of a FHE scheme to a more comprehensive set that includes rational numbers immediately enables the application of homomorphic encryption in scenarios that involve fractional data such as those associated with statistics, finance, machine learning, digital signal processing, among others, without any further need of data formatting. Besides the obvious benefits of such features, not having to format data at the bit level (for accommodating custom message spaces) represents, at the very minimum, less overhead. We believe that a leveled FHE scheme with these desired characteristics requires an approach that is distinct from those employed up to today.

We propose a new approach to construct a leveled FHE scheme that takes messages over a specialized set of rational numbers that can be sufficiently large to contain all rational numbers of interest for any real-world practical application. Our technique allows us to describe a private-key encryption scheme and turn it into a public-key encryption scheme where its public-key has length smaller than the ciphertext it generates. Moreover, both private-key and public-key leveled FHE schemes produce ciphertexts with the same length. We show that the security of our schemes can be clearly mapped to the AGCD assumption while we also introduce the notion of a new hardness assumption, which makes the security analysis clearer and more objective. We showcase a mathematical tool mostly used outside the context of cryptography, which enables our contributions, and we propose its use and further investigation in cryptography.

1.3 Hensel Codes

Between the end of the 19th and the beginning of the 20th centuries, Kurt Hensel introduced the p-adic numbers theory. One of Hensel's main motivations was to relate the ring integers $\mathbb{Z}$ to the field of rationals $\mathbb{Q}$. For our purposes, it suffices to provide a brief discussion of the fundamental idea. If p is prime, any positive integer x can be represented uniquely as an expansion of the form $x=a_0+a_1p+a_2p_2+ \ldots +a_np^n$, where $a_i$ is an integer with $0 \leq a_i < p$. In fact, one can similarly expand any rational number x/y by allowing negative powers of p. Such expansions are called p-adic numbers. In the p-adic number system, the elements of $\mathbb{Q}$ are represented as infinite expansions $\alpha = \Sigma_{-\infty}^{\infty} a_i p^i$. Applications of p-adic numbers are varied, and include dynamical systems, theoretical physics, algebraic geometry, non-Archemdian analysis, differential calculus, topology, and analytic functions.

Between the 1970s and 1980s, Krishnamurthy, Rao, Subramanian, Alparslan, Hehner and Horspool proposed the use of truncation of p-adic expansions to replace arithmetic operation on rational numbers by the corresponding operations on integers that represent those rational numbers. They named these special integers as Hensel codes and they established the foundation of the theory of Hensel codes (also known as the finite-segment p-adic arithmetic) as a solution to the problem of error-free computation, that is, the computation over approximations of real numbers in such a way that rounding errors do not occur. This property is particularly necessary when working with ill-conditioned problems and numerically unstable algorithms.

Converting rational numbers into Hensel codes is rather trivial, however, the inverse mapping of Hensel codes was for many years an open problem until Gregory identified the required boundaries in absolute value to the numerators and denominators of rational numbers so a Hensel code could be uniquely inverted. Having these boundaries well-defined allowed Miola to propose an efficient algebraic solution for inverting Hensel codes by applying a modified version of the Extended Euclidean Algorithm. Over the years, the theory of Hensel codes expanded to address a variety of areas benefited by error-free computation such as computation of Grobner basis, overflow detection, matrix inversion, fast integer division, parallel computation, solving linear systems of equations, polynomial matrix computations, to cite a few.

Hensel codes can be represented and computed in many forms, from the "dotted" representation to matrices of rational polynomials. In this work we focus on the integer representation of Hensel codes using just the first coefficient of a conventional truncated p-adic expansion. We show that Hensel codes can be p-adic and g-adic (defined via single or multiple primes, respectively) and we expand the original special set of rational numbers to represent as Hensel codes in order to achieve a bijection between those special rational numbers and a finite set of integers reduced modulo a prime or a prime composite.

1.4 General Intuition

We were initially interested in Hensel codes solely for purpose of establishing a bijection between a subset of the rationals and a finite set of integers so we could construct a level FHE scheme with a more comprehensive message space. In the past, the use of Hensel codes for error-free computation was shown to be a more efficient solution in comparison to known alternative. Could Hensel codes still provide advantages for error-free computation nowadays? In 2019, Barillas proposed an efficient machine learning classification approach based on Restricted Boltzmann Machines using Hensel codes. Barillas worked with limited hardware resources since the goal was to provide a solution suitable for embedded devices and classification problems over data containing a small to medium amount of features. Barillas' results over the MNIST dataset outperformed the current state-of-the-art of exact machine learning computations by a factor of 42 in terms of performance, and a factor of 62 in terms of energy efficiency. So, we were encouraged to proceed.

However, we identified an additional opportunity that is enabled by two facts: 1) The mapping we use to establish a connection between a special set of rational numbers and their corresponding Hensel codes has well-defined boundaries which are unique per prime or group of primes. Failure in observing these boundaries will lead to correctness violation. 2) The knowledge of the primes involved in the computation of Hensel codes is required for computing back their corresponding rational numbers. We then created a cryptosystem based on the hardness of inverting Hensel codes without the knowledge of the primes involved in that computation. We do it in such a way that trivial attempts will always violate the boundaries for correctness. Once the primes are unknown, so are the boundaries. This allows us to provide a new asymmetric encryption algorithm based on Hensel codes.

2. Hensel Codes

We now provide a sufficient and self-contained review of the theory of Hensel codes. While we omitted some portions of that theory (for lack of a direct connection with our contributions), we believe that more of the theory can not only be applied in future developments of our research. We hope that this work can motivate further study of Hensel codes as underlying tools for building cryptographic tools.

Error-free computation is a goal that has been long pursued. One way of addressing this problem is via infinite precision integer and rational number arithmetics, which can be very demanding concerning space and time resources. A promising alternative arises from the work of Kurt Hensel, who in 1908 introduced the p-adic number system or p-adic arithmetic, through which one can perform rational arithmetic over the integers. In p-adic number theory, p denotes a fixed prime and each rational number in $\mathbb{Q}$ is represented by a quantity called p-adic integer, which is a formal series $\Sigma_{i \geq 0}^{\infty} a_i p^i$ with integral coefficients $a_i$ satisfying $0 \leq a_i \leq p$. This quantity can be expressed infinitely or finitely and what is called the finite-segment p-adic arithmetic where we find an opportunity for constructing our scheme. The reader can find detailed introductions to the p-adic number theory.

2.1 Finite-Segment p-adic Arithmetic

For all rational numbers $\alpha = a/b$ there is a $n \in \mathbb{Z}$ such that a Hensel code h is given by:

$$h = a_0 + a_1 p + a_2 p^2 + \ldots + a_{n-1} p^{n-1} \qquad \text{Eq. A}$$

where $a_i$ is the base p representation of h.

Example A: Let a=2, b=3, p=5, n=5. We compute the Hensel code h as follows:

$$h = 4 + 1 \cdot 5 + 3 \cdot 5^2 + 1 \cdot 5^3 + 3 \cdot 5^4 = 2084 \qquad \text{Eq. B}$$

In Example A, $a_0=4$, $a_1=1$, $a_2=3$, $a_3=1$, and $a_4=3$. In fact, 2084 in base 5 is 31314 (the same $a_i$ in reverse order) so it is easy to see that the Hensel code h is the base p representation of a rational number $\alpha$. In general, a p-adic number is a base p representation (usually via an infinite p-adic expansion) of a rational number. Thus, a Hensel code is a finite p-adic number.

An alternative way to compute h is as follows: given $\alpha = a/b$, a fixed prime p and some positive $n \in \mathbb{Z}$, we have:

$$h = a \cdot b^{-1} \bmod p^n, h \in \{0, \ldots, p^n - 1\} \qquad \text{Eq. C}$$

where a, b and $p^n$ must be pairwise coprime.

Example B: Let a=2, b=3, p=5, n=5. We compute the Hensel code h as follows:

$$h = 2 \cdot 3^{-1} \bmod 5^5 = 2 \cdot 1042 \bmod 3125 = 2084. \qquad \text{Eq. D}$$

If b is not pairwise coprime with $p^n$, the inverse modulo $p^n$ for b fails to exist, thus we cannot compute h as shown in Example B. A limitation of the second approach to compute h with $p^n$ is that all values of b that are multiples of p will fail to have an inverse. However, this is only an issue for n>1. We will then consider the case where n=1 so we can just omit n. We rewrite Eq. C as follows:

$$h = a \cdot b^{-1} \bmod p, h \in \{0, \ldots, p-1\} \qquad \text{Eq. E}$$

Although Eq. E, which we refer to as the Hensel encode, is a very simple expression, for many years, finding its inverse, that is, the original rational a/b that generated h under p, remained an open problem for many years, until Miola introduced an algebraic solution for what we refer to as the Hensel decode. Miola observed that Gregory developed algorithms for the Hensel encoding and decoding; however, the decoding solution was based on look-up tables, which was inefficient as a general method. Notwithstanding, Miola took into consideration Gregory's unique answer for the Hensel decoding problem would only be possible if the absolute value of both the numerator and denominator of a/b was bounded by some value N. A rational number that would be under that bound was called an order-N Farey fraction. Only then would it be possible to uniquely retrieve a/b from h under p using a slightly modified version of the Extended Euclidean Algorithm (EEA). We use Gregory's method for encoding and Miola's method for decoding; however, we introduce a new definition for the set order-N Farey fractions.

Lemma A1: p/q is a convergent of a/b if:

$$\left| \frac{p}{q} - \frac{a}{b} \right| \leq \frac{1}{2q^2}. \qquad \text{Eq. F}$$

Before discussing our new definition of order-N Farey fractions and Miola's method for Hensel decoding, recall that a convergent of rational number c/d, is another rational number, typically denoted by $p_n/q_n$, obtained via a limited number of terms in a continued fraction with a total of n convergents where $p_n/q_n$ is the n-th convergent of c/d.

Miola's method finds the original a/b from a Hensel code h under p as a convergent of h/p. This procedure is captured by Theorem 1.

Theorem A: Given a Hensel code h and an odd prime p, a rational number a/b is a convergent of h/p if, by writing h as a Diophantine equation such that $h=ab^{-1}$ mod p and $hb-a \equiv 0$ mod p, there is an integer solution for k such that:

$$hb-a=kp \qquad \text{Eq. G}$$

and the following holds:

$$\left| \frac{h}{p} - \frac{k}{b} \right| \leq \frac{1}{b^2}. \qquad \text{Eq. H}$$

Proof: We start by rewriting $h=ab^{-1}$ mod p as $hb-a \equiv 0$ mod p. Then, in order to prove that $-k/b$ is indeed a convergent of h/p, we rearrange $|h-a/b|$ as $a/(bp)=h/p-k/b$. Notice that $hb-a$ is congruent to 0 and thus a multiple k of p. Therefore, we can write:

$$hb-a=kp \text{ and } a=hb-kp. \qquad \text{Eq. I}$$

So, when we divide both sides by bp we have:

$$\frac{a}{bp} = \frac{h}{p} - \frac{k}{b}. \qquad \text{Eq. J}$$

Then we just need to check that $-k/b$ is in fact a convergent of h/p since it holds that:

$$\left| \frac{h}{p^r} - \frac{k}{b} \right| \leq \frac{1}{b^2}, \qquad \text{Eq. K}$$

which can be computed by the EEA (the algorithm that computes all the convergents of any given fraction). So, we know that a/b is computed by the EEA in the form of $x_i/y_i$ for the i-th term (the first convergent) that satisfies $|x_i| \leq N$.

We now introduce Definition A, which depicts Miola's algebraic method for the Hensel decoding.

Definition A: (Hensel decoding) Given an odd prime p, $N=\lfloor\sqrt{p/2}\rfloor$, and a Hensel code h, set $x_0=p$, $x_1=h$, $y_0=0$, $y_1=1$, and $i=1$. Then, while $x_i > N$, the following is computed:

$$q=\lfloor x_{i-1}/x_i \rfloor$$

$$x_{i+1}=x_{i-1}-q \cdot x_i$$

$$y_{i+1}=y_{i-1}-q \cdot y_i$$

$$i=i+1. \qquad \text{Eq. L}$$

Then, the answer a/b is given by:

$$c/d=((-1)^{i+1} \cdot x_i)/y_i \qquad \text{Eq. M}$$

We write this syntax as $a/b=H^{-1}$ (p, h).

Notice that Eq. L is the actual computation of the convergents of h/p. If the algorithm never enters that loop, then no convergent is computed. If the algorithm enters the loop, it will stop computing the convergents when it finds the first convergent that does not satisfy the inequality $x_i > N$.

Now we have everything we need to introduce the definition of the set of order-N Farey fractions.

Definition B: (Order-N Farey Fractions) The set of order-N Farey fractions $\mathbb{F}_{N,p}$, is given by:

$$\mathbb{F}_{N,p} = \left\{ a/b \in \mathbb{Q}_p \,\middle|\, \begin{array}{c} a, b, c \text{ are pairwise coprime,} \\ \text{and } a/b \text{ is the convergent of } h/p \text{ via } EEA, \\ 0 \leq |a| \leq N, |b| \leq \lfloor p/N+1 \rfloor \end{array} \right\}. \qquad \text{Eq. N}$$

Now we can define the Hensel encoding using Definition B.

Definition C: (Hensel Encoding) Given an odd prime p and a rational number $a/b \in \mathbb{F}_{N,p}$, a Hensel code h is computed as follows:

$$h=ab^{-1} \text{ mod } p. \qquad \text{Eq. O}$$

We write this syntax as h=H (p, a/b).

Theorem B: For all $a/b \in \mathbb{F}_{N,p}$ and all odd primes p, the following holds:

$$18H^{-1}(p,H(a/b))=a/b. \qquad \text{Eq. P}$$

Proof: The elements of the set of order-N Farey fractions are irreducible fractions a/b such that $0 \leq |a| \leq N$ and $0 \leq |b| \leq \lfloor p/(N+1) \rfloor$. By Theorem A, we know that the fraction a/b that is encoded as h under p is a convergent of h/p. We also know that the EEA computes all the convergents of h/p. The algorithm for $H^{-1}$ (p, h) stops computing the convergents when it finds the first fraction that is under the N bound, which is precisely the fraction that originated h.

We can also use multiple primes to represent a rational number, which is referred to as a g-adic expansion of rational numbers, where, given unique odd primes $p_1, \ldots, p_k$, g is given by $g=\prod_{i=1}^{k} p_i$.

There are two ways of encoding an order-N Farey fraction a/b using g-adic numbers. One is to replace p by g such that:

$$h=H(g,a/b), \qquad \text{Eq. Q}$$

$$ab=H^{-1}(g,h). \qquad \text{Eq. R}$$

Since Hensel codes can be computed with p and g, we establish the distinction between the two asp-adic Hensel codes and g-adic Hensel codes.

Theorem C: There is a one-to-one mapping from order-N Farey fractions into g-adic Hensel codes where $N=\lfloor\sqrt{g/2}\rfloor$ and the set of g-adic Hensel codes is $\mathbb{Z}_g$.

The second way of encoding an order-N Farey fraction a/b using g-adic numbers is by computing a g-adic Hensel code tuple, where each element of the tuple is a p-adic Hensel code for each prime $p_i$ in g such that:

$$(h_1, \ldots, h_k)=H_g((p_1, \ldots, p_k),a/b). \qquad \text{Eq. S}$$

The procedure of Eq. S is captured by Definition D.

Definition D: Given k unique odd primes $p_1, \ldots, p_k$, $N=\lfloor\sqrt{g/2}\rfloor$ for $g=\prod_{i=1}^{k} p_i$, and $a/b \in \mathbb{F}_{N,p}$, g-adic Hensel code is computed as follows:

$$(h_1, \ldots, h_k)=(H(p_1,a/b), \ldots, H(p_k,a/b)). \qquad \text{Eq. T}$$

We write this syntax as $(h_1, \ldots, h_k)=H_g((p_1, \ldots, p_k), a/b)$.

Theorem D: For all unique odd primes $p_1, \ldots, p_k$ and $g=\prod_{i=1}^{k} p_i$, there is an isomorphism between g-adic numbers and p-adic numbers.

We decode a g-adic Hensel code tuple in two steps:
1. Transform $(h_1, \ldots, h_k)$ into h via Chinese Remainder Theorem (CRT);
2. Decode h such that $ab=H^{-1}$ (g, h).

Definition E: (g-adic Hensel Decode) Given k unique odd primes $p_1, \ldots, p_k$, $g=\prod_{i=1}^{k} p_i$, $N=\lfloor\sqrt{g/2}\rfloor$, and a g-adic Hensel code tuple $(h_1, \ldots, h_k)$, the corresponding order-N Farey fraction is given by:

$$h = \sum_{i=1}^{k} \frac{g}{p_i} \left( \left( \frac{g}{p_i} \right)^{-1} \bmod p_i \right) h_i \bmod g, \quad \text{Eq. U}$$

$$a/b = H^{-1}(g, h). \quad \text{Eq. V}$$

We write this syntax as $a/b = H_g^{-1}((p_1, \ldots, p_k), (h_1, \ldots, h_k))$.

2.2 Hensel Codes and the Extended Euclidean Algorithm

It was shown by R. T. Gregory that there is a one-to-one mapping from the so-called order-N Farey fractions $$\mathbb{F}_N := \{x/y \mid |x| \leq N, 0 < |y| \leq N\}, N = \lfloor \sqrt{(p-1)/2} \rfloor$$

to the finite field $\mathbb{Z}_p$, given via the mapping $x/y \rightarrow xy^{-1} \pmod{p}$. The major drawback of the order-N Farey fractions is that they only correspond to a subset of $\mathbb{Z}_p$. We will use a modification of the Extended Euclidean algorithm (EEA) to enlarge $\mathbb{F}_N$ to a set whose elements are in bijective correspondence with the elements of $\mathbb{Z}_p$. In particular, we construct a factor ring (isomorphic to the finite field of order p) from a subring of the rationals $\mathbb{Q}$ and then use the to-be-defined modification of the EEA to select one representative fraction from each coset of the factor ring. To this end, fix an odd prime p, and recall that the set $\{a/b \mid \gcd(p, b) = 1\}$ can be realized as the localization of the integers $\mathbb{Z}$ at the prime ideal (p). We will denote this ring by $\mathbb{Z}_{(p)}$. Since $\gcd(p, b) = 1$ guarantees that $b^{-1}$ exists in $\mathbb{Z}_p$, we can define the map $H_p: \mathbb{Z}_{(p)} \rightarrow \mathbb{Z}_p$ by $a/b \rightarrow ab^{-1} \pmod{p}$. It is easy to verify that this map is a surjective ring homomorphism. Consequently, we obtain an isomorphism $\mathbb{Z}_{(p)}/\ker(H_p) \cong \mathbb{Z}_p$. There are many ways to select representatives from the cosets of $\mathbb{Z}_{(p)}/\ker(H_p)$, but we will make our selection to guarantee that the set of representatives contains $\mathbb{F}_N$.

Recall that the Extended Euclidean Algorithm (EEA) calculates the greatest common divisor of two integers $x_0, x_1$ along with the associated Bezout coefficients. The computation generates the tuples $(x_2, \ldots, x_n)$, $(y_2, \ldots, y_n)$, $(z_2, \ldots, z_n)$, and $= \lfloor x_{i-1} - 1/x_i \rfloor$ such that:

$x_{i+1} = x_{i-1} - q_i x_i$, where $x_0, x_1$ are the input, $y_{i+1} = y_{i-1} - q_i y_i$, with $y_0 = 1, y_1 = 0$, $z_{i+1} = z_{i-1} - q_i z_i$, with $z_0 = 0, z_1 = 0$.

Moreover, for each $i \leq n$, we have $y_i x_1 + z_i x_0 = x_i$. The computation stops with $x_n = 0$, at which point $x_{n-1} = \gcd(x_0, x_1)$. We define a modified version of this algorithm, as follows:

Definition 1 (Modified Extended Euclidean Algorithm). Let g be a product of distinct odd primes, $h \in \mathbb{Z}$, and $N = \lfloor \sqrt{(g-1)/2} \rfloor$. Run EEA with $x_0 = g$ and $x_1 = h$. Once $|x_i| \leq N$, output $(x, y) = ((-1)^{i+1} x_i, (-1)^{i+1} y_i)$. We write this as MEEA $(g, h) = (x, y)$. Observe that there is an integer z (namely, $(-1)^{i+1} z_i$) such that $yh + zg = x$.

Lemma 1. Let g be a product of distinct, odd primes, $N = \lfloor \sqrt{(g-1)/2} \rfloor$, and $h, h' \in \mathbb{Z}_g$. The following hold:

(i) If MEEA$(g, h) = (x, y)$, then $|x| \leq N$ and $|y| \leq 2N$.

(ii) Let p be prime, MEEA$(p, h) = (x, y)$, and MEEA$(p, \alpha) = (x', y')$. $\alpha = h \pmod{p}$ if and only if $x = x'$ and $y' = y \pmod{p}$.

(iii) MEEA$(g, h) = (0, \bullet)$ if and only if $\gcd(g, h) > N$ or $h = 0$.

Proof (i) Suppose MEEA$(g, h) = ((-1)^{i+1} x_i, (-1)^{i+1} y_i)$. That $|x| \leq N$ is immediate from the stopping condition in MEEA. The outputs of the EEA satisfy:

$$|y_k| \leq \frac{x_0}{x_{k-1}}, \text{ for all } k.$$

By definition, $x_{i-1} > N$. Whence, $N' = \sqrt{(g-1)/2}$, $$|y_i| \leq \frac{g}{x_{i-1}} < \frac{g}{N'} < \frac{2(N')^2 + 1}{N'} = 2N' + \frac{1}{N'}.$$

It follows that $$|y_i| \leq \left\lfloor 2N' + \frac{1}{N'} \right\rfloor = 2N,$$

proving 1.

(ii) By hypothesis, there is an integer k such that $\alpha = h + kg$. Suppose that $\alpha \neq h$ (i.e., at least one of h,k is nonzero). Apply the EEA in two cases: (1) $x_0 = p$, $x_1 = h$, and (2) $x_0 = p$, $x_1 = h + kp$. After three iterations of (2), one observes that the values of $x_i$ match those obtained after one iteration of (1). Moreover, MEEA applied to (1) and (2), respectively, will not terminate before the values of $x_i$ match. This proves $x = x'$. The above, in conjunction with $yh + zp = x$ and $y'\alpha + z'p = x'$, yields $yh = y'\alpha$. Then $yh - y'h = y'kp$, and so $y'h = yh \pmod{p}$. Since $\gcd(g, h) = 1$, $y' = y \pmod{p}$. The converse follows easily.

(iii) Suppose $\gcd(g, h) > N$. Recall that the EEA with $x_0 = g$ and $x_1 = h$ terminates when $x_n = 0$, at which point $x_{n-1} = \gcd(g, h)$. Item 3 then follows from the stopping condition in MEEA. Conversely, if MEEA$(g, h) = (0, \bullet)$, then $\gcd(g, h) > N$. For if not, then MEEA$(g, h) = ((-1)^{i+1} x_i, \bullet)$, where $i \leq n - 1$, a contradiction.

Definition 2 (Order-(N,p) Farey Fractions). Let p be an odd prime and $N = \lfloor \sqrt{(p-1)/2} \rfloor$. We define the set of order-(N,p) Farey fractions as:

$$\mathbb{F}_{N,p} := \left\{ \frac{x}{y} : \exists h \in \mathbb{Z}_p \text{ s.t. } MEEA(p, h) = (x, y) \right\}.$$

Throughout the paper, we will consider $\mathbb{F}_{N,p}$ with the familiar addition and multiplication on $\mathbb{Q}$. Note that $\mathbb{F}_{N,p}$ is not closed under these operations. The following lemma collects some important facts about $\mathbb{F}_{N,p}$.

Proposition 1. Let p be an odd prime and $N = \lfloor \sqrt{(p-1)/2} \rfloor$.

(i) $\mathbb{F}_N \subset \mathbb{F}_{N,p}$.

(ii) If $x/y \in \mathbb{F}_{N,p}$, then $|x| \leq N$ and $|y| \leq 2N$.

(iii) The elements of $\mathbb{F}_{N,p}$ are in lowest terms.

(iv) Distinct elements of $\mathbb{F}_{N,p}$ lie in distinct cosets of $\mathbb{Z}_{(p)}/\ker(H_p)$.

(v) $H_p: \mathbb{F}_{N,p} \rightarrow \mathbb{Z}_p$ is a bijection.

Proof (i) Let $x/y \in \mathbb{F}_N$ such that $h = xy^{-1} \pmod{p}$, and say MEEA$(p, h) = (x_i, y_i)$. By construction, $x_i \leq N$ and $x_j > N$ for all $j < i$. As shown by Kornerup, implementing EEA with $x_0 = p$ and $x_1 = h$ will yield $x_k/y_k = x/y$ for some k. Now, suppose that $|y_i| > N$. One easily verifies inductively $|y_j| \leq |y_{j+1}|$ and $x_j > x_{j+1}$ for all j. Whence for all i, either $x_i > N$ or $|y_i| > N$, contradicting $x_k/y_k \in \mathbb{F}_N$. Thus $|y_i| > N$, and $x_i/y_i \in \mathbb{F}_N$. Finally, since $x_i y_i^{-1} \pmod{p} = xy^{-1} \pmod{p} = h$, and representations of elements of $\mathbb{F}_N$ in $\mathbb{Z}_p$ are unique, we conclude that $x_i/y_i = x/y$. This shows that $x/y \in \mathbb{F}_{N,p}$.

(ii) Use Lemma 1 with $g = p$.

(iii) MEEA$(p, 0) = (0, \bullet)$, so let $h \in \mathbb{Z}_p$ be nonzero and MEEA$(p, h) = (x, y)$. By definition there is an integer z (output by EEA) such that x=yh+zp. Further, properties of greatest common divisors yield:

$$gcd(zp,y)=gcd(yh+zp,y)=gcd(zp,y).$$

By (ii), $0<|y|<p$, we deduce Lemma 1(iii), that $0<|z|<p$. Consequently, $$gcd(zp,y)=gcd(z,y) \cdot gcd(p,y)=gcd(z,y).$$

Now, $gcd(z, y)=1$, which proves (iii).

(iv) First, notice that (ii) implies $\mathbb{F}_{N,p} \subset \mathbb{Z}_{(p)}$. Let $x/y$, $x'/y' \in \mathbb{F}_{N,p}$ be distinct. Necessarily, $H_p(x/y) \neq H_p(x'/y')$. Since $H_p$ is a homomorphism, then $H_p(x/y-x'/y') \neq 0$, which implies $x/y$ and $x'/y'$ lie in distinct cosets.

(v) The result follows immediately from (iv) and the isomorphism $\mathbb{F}_{(p)}/\ker(H_p) \cong \mathbb{Z}_p$.

We may now define the mapping that allows us to recover an element of $\mathbb{F}_{N,p}$ given an arbitrary integer.

Definition 3. Let p be prime and $h \in \mathbb{Z}$. Define:

$$H_p^{-1} : \mathbb{Z} \to \mathbb{F}_{N,p} \text{ by } h \to \frac{x}{y \bmod p}, \qquad \text{Eq. 1}$$

where MEEA $(p, h)=(x, y)$.

Remark 1. Lemma 1(ii) guarantees that the output $x/y$ (mod p) from the preceding definition is in $\mathbb{F}_{N,p}$. Moreover, by the definition of the order-$(N,p)$ Farey fractions, $H_p^{-1}$ is surjective.

Proposition 2. If $x/y \in \mathbb{F}_{N,p}$ and $h \in \mathbb{Z}_p$, then $H_p^{-1}(H_p(x/y))=x/y$ and $H_p(H_p^{-1}(h))=h$.

Proof Obvious.

The following results establish the compatibility of $H_p^{-1}$ with arbitrary arithmetic circuits. For simplicity, we represent a circuit by the multivariate polynomial which it computes.

Lemma 2. Let $h_1, \ldots, h_k \in \mathbb{Z}$. If P is a polynomial in k variables over $\mathbb{Z}$ which takes rational arguments, and $H_p^{-1}(P(h_1, \ldots, h_k))=a/b$, then:

$$H_p\left(P\left(H_p^{-1}(h_1), \ldots, H_p^{-1}(h_k)\right)\right) = H_p\left(\frac{a}{b}\right).$$

Proof Suppose $H_p^{-1}(h_i)=x_i/y_i$. Certainly $x_i y_i^{-1}=h_i(\bmod p)$, whence $$P(H_p^{-1}(h_1), \ldots, H_p^{-1}(h_k))=P(h_1, \ldots, h_k)(\bmod p).$$

The result follows, since $P(h_1, \ldots, h_k)=ab^{-1}(\bmod p)$.

Proposition 3. If $h_1, \ldots, h_k \in \mathbb{Z}$ and P is a polynomial in k variables over $\mathbb{Z}$ which takes rational arguments, then:

$$H_p^{-1}(P(h_1, \ldots, h_k))=H_p^{-1}(H_p(P(H_p^{-1}(h_1), \ldots, H_p^{-1}(h_k)))).$$

Proof Since $\mathbb{F}_{N,p}$ is not closed under addition and multiplication then $$\mathcal{P}=P(H_p^{-1}(h_1), \ldots, H_p^{-1}(h_k))$$

need not be an element of $\mathbb{F}_{N,p}$. However, by Lemma 3, $\mathcal{P}$ and $H_p^{-1}((h_1, \ldots, h_k))$ lie in the same coset (are equivalent modulo p). Consequently, $H_p^{-1}(H_p(\mathcal{P}))=H_p^{-1}(P(h_1, \ldots, h_k))$.

We now present the remaining maps which are fundamental to our scheme.

Definition 4. Let $g=p_1, \ldots, p_k$ be a product of at least two distinct primes. Define maps:

$$H_g : \mathbb{Q} \to \mathbb{Z}_g \text{ by } \frac{x}{y} \to \begin{cases} xy^{-1}(\bmod g), & \text{if } gcd(g, y)=1 \\ 0, & \text{if } gcd(g, y) \neq 1 \end{cases}$$

$$\tilde{H}_g^{-1} : \mathbb{Z} \to \mathbb{Q} \text{ by } h \to \frac{x}{y \bmod g}, \text{ where } MEEA(g, h)=(x, y).$$

Remark 2. If n is an integer, then $H_g(n)=n \pmod g$.

Remark 3. We write "$\tilde{H}_g^{-1}(\cdot)$" instead of "$H_g^{-1}(\cdot)$" because $\tilde{H}_g^{-1}$ is not the inverse of $H_g$ when g is composite. This is because if $\tilde{H}_g^{-1}(h)=x/y$ we may have $y|g$, in which case y is not invertible modulo g, and so (provided $x \neq 0$) $H_g(\tilde{H}_g^{-1}(x))=0 \neq x/y$.

Recall that the Chinese Remainder Theorem (CRT) simply describes an isomorphism $\mathbb{Z}_{p_1} \times \ldots \times \mathbb{Z}_{p_k} \cong \mathbb{Z}_{p_1 \ldots p_k}$. The image of $(h_1, \ldots, h_k)$ under this isomorphism will be denoted by $h=CRT_{p_1, \ldots, p_k}(h_1, \ldots, h_k)$.

Henceforth, for primes $p_1, \ldots, p_k$ and $h_1, \ldots, h_k \in \mathbb{Z}$, we will denote:

$$\tilde{H}_{p_1 \ldots p_k}^{-1}(CRT_{p_1, \ldots, p_k}(h_1, \ldots, h_k))$$

by $\tilde{H}_{p_1, \ldots, p_k}^{-1}(h_1, \ldots, h_k)$.

Lemma 3. Let $g=p_1, \ldots, p_k$ be a product of distinct primes. If $H_g(x/y) \neq 0$, then $H_g(x/y)=H_{p_i}(x/y)(\bmod p_i)$.

Proof. To avoid confusion, we will denote the (multiplicative) inverse of y modulo n by $y_n^{-1}$. If $h=H_g(x/y) \neq 0$, then y is invertible modulo $p_i$ for each i. Put $h_i=H_{p_i}(x/y)$. By definition, $h=xy_g^{-1}(\bmod g)$ and $h_i=xy_{p_i}^{-1} \pmod{p_i}$ for all i. Multiplying both sides of each congruence by y yields $hy=x(\bmod g)$ and $x=h_i y(\bmod p_i)$. It follows that $hy=h_i y \pmod{p_i}$ for all i. Finally, since y is invertible modulo each $p_i$, $h=h_i(\bmod p_i)$.

Proposition 4. If $g=p_1, \ldots, p_k$ is a product of distinct primes, $H_g(x/y) \neq 0$, and $x/y \in \mathbb{F}_{N,p_i}$, then $H_{p_i}^{-1}(H_g(x/y))=x/y$.

Proof By Lemma 1(ii), Lemma 3, and the definition of $H_{p_i}^{-1}$, we see that:

$$H_{p_i}^{-1}(H_g(x/y))=H_{p_i}^{-1}(H_{p_i}(x/y)).$$

The result then follows from Lemma 2.

Lemma 4. If g is a product of distinct primes and $g|n$, then $\tilde{H}_g^{-1}(n)=0$.

Proof Observe that $gcd(g, n)=g > \lfloor \sqrt{(g-1)/2} \rfloor$. The result then follows from Lemma 1(iii).

3. The AGCD Problem

Informally, the AGCD problem is defined as follows: given polynomially many samples of the form $x=r+qp$ for a randomly chosen odd prime p, find p. Since, in the remainder of this paper we will refer to known $(\rho, \eta, \gamma)$ AGCD parameters, a formal definition of the AGCD problem is reproduced below.

Definition 5. (AGCD). Let p, $X \geq 1$, and $\phi$ a distribution over $\mathbb{Z}$. We define $A_{X,\phi}^{AGCD}(p)$ as the distribution over $\mathbb{Z}$ obtained by sampling $$q \leftarrow \mathbb{Z} \cap \left[0, \frac{x}{p}\right)$$

and $r \leftarrow \phi$, and returning $x=qp+r$.

Let $\mathcal{D}$ be a distribution over $\mathbb{Z} \cap [0,X)$. $AGCD_{X,\phi}(\mathcal{D})$ consists in distinguishing, given arbitrarily many independent samples, between the uniform distribution over $\mathbb{Z} \cap [0, X)$ and the distribution $A_{X,\phi}^{AGCD}(p)$ for $p \leftarrow \mathcal{D}$. We use the notation $AGCD_{X,\phi}(\mathcal{D})$ to emphasize the number of samples m used by the eventual distinguisher. We say that an algorithm $\mathcal{A}$ is an $(\epsilon_1, \epsilon_2)$-distinguisher for $AGCD_{X,\phi}(\mathcal{D})$ if, with probability $\geq \epsilon_2$ over the choice of $p \leftarrow \mathcal{D}$, its distinguishing advantage between $A_{X,\phi}(p)$ and $U(\mathbb{Z} \cap [0, X))$ is $\geq \epsilon_1$.

For $\rho$, $\eta$, $\gamma \geq 1$, the $(\rho, \eta, \gamma)$-AGCD problem is $AGCD_{2\gamma,\phi}(\mathcal{D})$ with $\mathcal{D}$ the uniform distribution over $\eta$-bit prime integers and $\phi$ the uniform distribution over $\mathbb{Z} \cap (-2^\rho, 2^\rho)$.

Cheon and Stehle discuss a reduction from the Learning With Errors (LWE) problem to a variant of the AGCD where such search variant consists in finding the unknown p while also introducing a reduction from the search variant to the decision variant. They arrive at a set of secure AGCD parameters via reduction of a LWE instance. For appreciating this reduction, we refer the reader to since we shall not repeat that discussion in this work. Instead, we will use the proposed AGCD parameters.

3.1 Recommended AGCD Parameters

We let $\rho$ denote the size of the noise, $\eta$ denote the size of the secret greatest common divisor, and $\gamma$ denote the size of an AGCD sample. Cheon and Stehle note that for the AGCD problem to be potentially hard, the parameters must satisfy the following: $\rho \geq \lambda$ in order to prevent brute force attacks on the noise, $\eta > \rho$, and $\gamma \geq \Omega((\lambda/\log \lambda)(\eta-\rho)^2)$ in order to prevent lattice reduction attacks on AGCD such as orthogonal lattice attacks, as well as the Lagarias' simultaneous Diophantine approximation attack, and the Cohn-Heninger attack.

4. A Private-Key Leveled FHE Scheme

Now we introduce a private-key leveled FHE scheme based on Hensel codes. Our motivation is to provide a basic blueprint for a leveled FHE scheme with Hensel codes and then use it as the foundation of a public-key leveled FHE scheme by only applying an asymmetric property we have with Hensel codes. The reader can see this private encryption scheme as first step towards its public-key counterpart, which is the candidate scheme we want to highlight. For this reason, we will concentrate the discussions about correctness, security, and practical implications on the public-key version.

Given a parameter $\lambda$ and the parameter d, define $\rho$, $\eta$, $\gamma$, and $\mu$ as follows: $\rho=\lambda$, $\eta=2(d+2)\lambda$, $\mu=\gamma-\eta-2\lambda$, and $$\gamma = \frac{\lambda}{\log_2(\lambda)}(\eta - \rho)^2.$$

The encryption scheme is then given by:

Gen takes $\lambda$ and d as inputs and generates uniform primes $p_1, \ldots, p_5$ such that $$|p_1|_{bits} = \rho + 1,$$

$$|p_2|_{bits} = |p_3|_{bits} = \frac{\rho}{2},$$

$$|p_4|_{bits} = \eta,$$

$$|p_5|_{bits} = \mu.$$

We set private secret key $sk=(p_1, p_2, p_3, p_4)$ and public evaluation key $evk=g=\Pi_{i=1}^{5} p_i$. Note that $|g|_{bits}=\gamma$. The message space is defined as $\mathcal{P}=\mathbb{F}_{N,p_1}$. We write the syntax as $(sk, evk) \leftarrow Gen(1^\lambda, 1^d)$.

Enc takes a message $m \in \mathcal{P}$ and sk, evk as inputs, generates uniform and independent $s_1 \leftarrow \mathbb{Z}_{2^{\lambda-1}}$, $s_2 \leftarrow \mathbb{Z}_{p_2}$, $s_3 \leftarrow \mathbb{Z}_{p_3}$, and $\delta \leftarrow \mathbb{Z}_{g/p_4}$, and then computes $c=|H_g(s_1 \cdot \tilde{H}_{p_1,p_2,p_3}^{-1}(0, s_2, s_3)+\delta_{p_4})|_g$. We write this as $c \leftarrow Enc_{sk,evk}(m)$.

Dec takes c and sk as inputs and computes $m=H_{p_1}^{-1}(H_{p_1}(H_{p_4}^{-1}(c)))$. We write this as $m=Dec_{sk}(c)$.

Addition and multiplication of ciphertexts are computed in the natural way over the integers modulo g.

Remark 4. In the encryption algorithm, let $x/y=\tilde{H}_{p_1,p_2,p_3}^{-1}(0, s_2, s_3)$. Then, $x/y$ is a rational encoding of zero, and so is $s_1 \cdot x/y$. Moreover, setting $|p_1|_{bits}=\rho+1$ implies $p_1 > 2\lfloor\sqrt{(p_1 p_2 p_3 - 1)/2}\rfloor$, which guarantees (by Lemma 2.5(ii)) that $\gcd(p_1, y)=1$, so $H_{p_1}(x/y)$ is defined.

Remark 5. In the decryption algorithm, for all c output by Enc, with high probability, it holds that $H_{p_4}^{-1}(c) \notin \mathbb{F}_{N,p_1}$. We address this issue by computing $H_{p_1}(H_{p_4}^{-1}(c))$ which gives as a Hensel code in $\mathbb{Z}_{p_1}$. Then, we can just decode that Hensel code using $p_1$, which gives us the expression in the decryption algorithm, so we obtain the desired member of $\mathbb{F}_{N,p_1}$.

5. A Public-Key Leveled FHE Scheme

Now we introduce a public-key leveled FHE scheme that is similar to the previously described private-key encryption with the exception that we now explore asymmetric Hensel "encodings." The parameters we use are conservative. The reason for employing a more conservative parameter definition is due to the fact that the ciphertext expansion of our construction is significantly more efficient than any leveled FHE construction where the message space is defined as $\{0, 1\}$. At the same time, we know there are room for optimizations which can further improve the already encouraging runtime results presented in Section 7.1. Given a parameter and the parameter d, define $\eta$, $\gamma$, and $\mu$ as follows:

$$\rho=\lambda, \eta=d\lambda, \mu=d^2\lambda \log_2(\lambda)-\eta-2\lambda-3, \gamma=2\eta+(3\lambda)/2+\mu+3. \quad \text{Eq. 2}$$

Gen takes $1^\lambda$ and $1^d$ as input and generates uniform and independent odd primes $p_1$, $p_2$, $p_3$, and $p'_4$ such that $|p_1|_{bits}=\lambda$, $|p_2|_{bits}=\lambda+3$, $|p_3|_{bits}=\eta$, $|p'_4|_{bits}=\eta$, $|p_5|_{bits}=\mu$, so we compute $p_4=(p'_4)^{\mu/\eta+1}$. Let $g=p_1 \ldots p_4$ and $g'=p_3 p_4$. For $t \leftarrow \mathbb{Z}_{2^{\lambda-1}}$ and $\delta_e \leftarrow \mathbb{Z}_{2^{\lambda\cdot\eta}}$, we compute:

$$e=H_g(H_{p_3}(\tilde{H}_{p_1,p_2}^{-1}(0,t))+\delta_e p_3). \quad \text{Eq. 3}$$

The public key is $pk=(e, g', evk=g)$ and the secret key is $sk=(p_1, p_3)$.

Enc encrypts a message $m \in \mathbb{F}_{N,p_1}$ by choosing $s_1, s_2 \partial \mathbb{Z}_{2^{\lambda\cdot\eta}}$ and $\delta \leftarrow [p_1 p_2, p_1 p_2 p_4) \cup \mathbb{Z}$ and then computing:

$$c \leftarrow Enc_{pk,evk}(m)=H_g(H_g(s_1 e+m)+s_2 g'+((g')^2)) \quad \text{Eq. 4}$$

Dec takes a ciphertext c as input and computes m as follows:

$$m=Dec_{sk,pk}(c)=H_{p_1}^{-1}(H_{p_1}(H_{p_3}^{-1}(c))). \quad \text{Eq. 5}$$

Addition and multiplication of ciphertexts are computed in the natural way over the integers modulo g.

Remark 6. The constant e in the public key should never equal $\delta_e p_3$, else an adversary trivially computes gcd(e, g')=$p_3$ which compromises the secret key. To this end, recall that $\tilde{H}_{p_1,p_2}^{-1}(0, t) = \tilde{H}_{p_1,p_2}^{-1}(h)$, where h=CRT$_{p_1,p_2}(0, t)$. Since t≠0, h≠0 and gcd(h, $p_1 p_2$)=$p_1$, Lemma 1(iii) then implies that $\tilde{H}_{p_1 p_2}^{-1}(h)$≠0 as long as $p_1 \leq \lfloor\sqrt{(p_1 p_2 - 1)/2}\rfloor$. This is guaranteed since $|p_1|_{bits}=\lambda$ and $\|\lfloor\sqrt{(p_1 p_2-1)/2}\rfloor\|_{bits} > \lambda$.

5.1 Correctness

Here we continue with the previously-adopted convention of using multivariate polynomials instead of arithmetic circuits.

Definition 6. Let $\mathcal{P}_{k,n} \subset \mathbb{Q}\lfloor x_1, \ldots, x_k \rfloor$ be the family of polynomials of the form $\mathcal{P}(x_1, \ldots, x_k) = y_1 * y_2 * \ldots * y_n$, where $y_i \in \{x_1, \ldots, x_k\}$ and * is either + or ×.

Proof. If P∈ $\mathcal{P}_{k,n}$ has i≤n−1 additions, then the numerator of x is the sum of i+1 monomials, each being a product of the $a_i$, $b_j$. Moreover, the denominator y is simply a product of n (not necessarily distinct) of the $b_j$. Note that for each monomial m summand of x satisfies: m/y is a product (possibly with repeated factors) of some number of the $a_i/b_i$. It follows that each monomial in the numerator is a product of at most n of the $a_i$, $b_j$. For if there is a monomial m with more than n factors, then m/y reduces to a fraction with more factors (the $a_i$, $b_j$) in the numerator than the denominator. Such a fraction cannot satisfy the above note, and so a contradiction is obtained. Now, since $|a_i|, |b_j| \leq \alpha$, we see that the denominator y and the monomial summands of x all have absolute value at most $\alpha^n$. The result then follows since x has at most n monomial summands.

Theorem 1 (Correctness). For all sk, pk, and evk output by Gen and all m∈ $\mathbb{F}_{N,p_1}$, $$Dec_{sk,pk}(Enc_{pk,evk}(m))m. \qquad \text{Eq. 6}$$

Let P∈ $\mathcal{P}_{p_1,D}$, $m_1, \ldots, m_k \in \mathbb{F}_{N,p_1}$ and $c_i \leftarrow Enc_{pk,evk}(m_i)$. If $P(m_1, \ldots, m_k) \in \mathbb{F}_{N,p_1}$, d≤λ, and D≤(d/5)−1, then:

$$Dec_{sk,pk}(P(c_1, \ldots, c_k)) = P(m_1, \ldots, m_r). \qquad \text{Eq. 7}$$

Proof Let m∈ $\mathbb{F}_{N,p_1}$, and suppose c=Enc$_{pk, evk}$(m). By construction, $$c = H_g(H_g(se+m)+s_2 g'\delta(g')^2) = H_g(se+m)+\alpha p_3, \alpha \in \mathbb{Z},$$

where e=$H_g(H_{p_3}(\tilde{H}_{p_1,p_2}^{-1}(0, t) + \delta_e p_3))$ and s∈ $\mathbb{Z}_{p_1}$.

Proceeding with Dec (which computes $H_{p_1}^{-1}(H_{p_1}(H_{p_3}^{-1}(c)))$) and applying Proposition 2 and Proposition 3, we obtain:

$$H_{p_3}^{-1}(c) = H_{p_3}^{-1}(H_{g'}(se+m) + \alpha p_3), \text{ for some } \alpha \in \mathbb{Z}$$
$$= H_{p_3}^{-1}\left(H_{p_3}\left(H_{p_3}^{-1}(H_{g'}(se+m))+H_{p_3}^{-1}(\alpha p_3)\right)\right)$$
$$= H_{p_3}^{-1}\left(H_{p_3}\left(H_{p_3}^{-1}(H_{g'}(se+m))\right)\right)$$
$$= H_{p_3}^{-1}(H_{g'}(se+m))$$

Put $x/y = \tilde{H}_{p_1,p_2}^{-1}(0, t)$ and $N = \lfloor\sqrt{(p_3-1)/2}\rfloor$. We note that $|s|_{bits} \leq \lambda$, and deduce from Lemma 1(i) that $|x|_{bits} \leq \lambda+1$ and $|y|_{bits} \leq \lambda+2$. Further, since $(d\lambda-2)/2 \leq |N|_{bits}$ (for d≥5), we see that $|sx|_{bits}, |y|_{bits} \leq |N|_{bits}$. Consequently sx/y∈ $\mathbb{F}_N \subset \mathbb{F}_{N,p_3}$.

Now, through repeated applications of the above observation, Lemma 1(iii), Proposition 3, and Lemma 4, we obtain:

$$H_{p_3}^{-1}(H_{g'}(se+m)) = H_{p_3}^{-1}\left(H_{p_3}\left(\frac{sx}{y}+m\right)\right).$$

By comparing bit lengths (as above), we find that sx/y+m∈ $\mathbb{F}_{N,p_3}$ (this time, as long as d≥6). Thus, $H_{p_3}^{-1}(c) = sx/y+m$.

Lastly, we compute:

$$H_{p_1}^{-1}\left(H_{p_1}\left(\frac{sx}{y}+m\right)\right) = H_{p_1}^{-1}\left(H_{p_1}\left(\frac{sx}{y}\right)+H_{p_1}(m)-kp_1\right), \; k\in\{0,1\}.$$

Since $H_{p_1}$ is a ring homomorphism and s∈ $\mathbb{Z}_{2^{\lambda-1}} \subset \mathbb{Z}_{p_1}$, we have $H_{p_1}(sx/y) = H_{p_1}(s)H_{p_1}(sx/y)(\mod p_1) = sH_{p_1}(sx/y) - np_1$ for some n∈ $\mathbb{Z}$. Moreover, $H_{p_1}(x/y)=0$ by construction.

Whence, $$H_{p_1}^{-1}\left(H_{p_1}\left(\frac{sx}{y}+m\right)\right) = H_{p_1}^{-1}(H_{p_1}(m) - (k+n)p_1).$$

With a final application of Proposition 3 and Lemma 4, the above simplifies to $H_{p_1}^{-1}(H_{p_1}(m)) = m$. Thus Eq. 6 is established.

We now show that the scheme is compatible with homomorphic operations. Let $c_1, \ldots, c_k \in \mathbb{Z}_g$ be ciphertexts with corresponding messages $m_i \in \mathbb{F}_{N,p_1}$, and P∈ $\mathcal{P}_{k,D}$. Then, as above, there are $s_i \in \mathbb{Z}_{2^{\lambda-1}}$ and an integer α' such that for each i, $c_i = H_g(s_i e + m_i) + \alpha' g'$. Suppose further that $P(m_1, \ldots, m_k) \in \mathbb{F}_{N,p_1}$. Proceeding as in the proof of (6), we compute:

$$H_{p_3}^{-1}(P(c_1, \ldots, c_k)) = H_{p_3}^{-1}\left(P\left(H_{g'}(s_1 e + m_1), \ldots, H_{g'}(s_k e + m_k)\right)\right)$$
$$= H_{p_3}^{-1}\left(H_{p_3}\left(P\left(H_{p_3}^{-1}(H_{g'}(s_1 e + m_1)), \ldots, H_{p_3}^{-1}(H_{g'}(s_k e + m_k))\right)\right)\right)$$
$$= H_{p_3}^{-1}\left(H_{p_3}\left(P\left(s_1\frac{x}{y}+m_1, \ldots, s_k\frac{x}{y}+m_k\right)\right)\right).$$

Now, let $x_i/y_i = s_i x/y + m_i$ and $x^*/y^* = P(x_1/y_1, \ldots, x_k/y_k)$. We will show that $x^*/y^* \in \mathbb{F}_{N,p_1}$. Recall that $|s_i|_{bits} \leq \lambda$, $|x_i|_{bits} \leq \lambda+1$ and $|y_i|_{bits} \leq \lambda+2$.

It follows that $|x_i|_{bits} \leq (5\lambda+3)/2$ and $|y_i|_{bits} \leq (3\lambda+3)/2$. For simplicity, we take $(5\lambda+3)/2$ as the bound for bit length for both $x_i$ and $y_i$.

By invoking Lemma 5, and the binary logarithm (to count bit lengths), we have:

$$|x^*|_{bits}, |y^*|_{bits} \leq \log_2(D) + D\left(\frac{5\lambda+3}{2}\right) + 1.$$

Now, recalling that $\lfloor\sqrt{(p_3-1)/2}\rfloor_{bits}$, we see that:

$$\log_2(D) + D\left(\frac{5\lambda+3}{2}\right) + 1 \leq \frac{d\lambda - 2}{2}$$

is a sufficient condition to guarantee that $x^*/y^* \in \mathbb{F}_N$, where $N=\lfloor\sqrt{(p_3-1)/2}\rfloor$. Easy algebraic manipulations verify that the above inequality reduces to:

$$\frac{\log_2(D^2)+3D+3}{d-5D} \leq \lambda.$$

The hypotheses that $d \leq \lambda$ and $D \leq (d/5)-1$ guarantees that the above inequality is true. Whence, $x^*/y^* \in \mathbb{F}_N \subset \mathbb{F}_{N,p_3}$, and $$H_{p_3}^{-1}(P(c_1, \ldots, c_k)) = \frac{x^*}{y^*} = P\left(\frac{x_1}{y_1}, \ldots, \frac{x_k}{y_k}\right).$$

All that remains is to compute $H_{p_1}^{-1}(H_{p_1}(x^*/y^*))$. To this end, observe that since $H_{p_1}$ is a homomorphism under addition and multiplication modulo $p_1$, $H_{p_1}(x_i/y_i) = H_{p_1}(s_i x/y) + H_{p_1}(m_i) - \alpha_i p_1 = H_{p_1}(m_i) - \alpha_i p_1$, and $H_{p_1}(P(x_1/y_1, \ldots, x_k/y_k)) = H_{p_1}(P(H_{p_1}(x_1/y_1), \ldots, H_{p_1}(x_k/y_k))) - \alpha p_1$, where $\alpha, \alpha_i \in \mathbb{Z}$. Now, by the preceding observations and Proposition 3, we obtain:

$$H_{p_1}^{-1}\left(H_{p_1}\left(\frac{x^*}{y^*}\right)\right) = H_{p_1}^{-1}(P(H_{p_1}(m_1) - \alpha_1 p_1, \ldots, H_{p_1}(m_k) - \alpha_k p_1) - \alpha p_1)$$

$$= H_{p_1}^{-1}(H_{p_1}(P(m_1, \ldots, m_k))).$$

Finally, since $P(m_1, \ldots, m_k) \in \mathbb{F}_{N,p_1}$, $$H_{p_1}^{-1}(H_{p_1}(P(m_1, \ldots, m_k))) = P(m_1, \ldots, m_k).$$

This completes the proof of Eq. 7.

Remark 7. The set $\mathcal{P}_{p_1,D} = \lfloor(d/5)-1\rfloor$, does not contain all polynomials with which our scheme is compatible. In particular, we note that for any polynomial $Q$ taking rational arguments: if $Q(m_1, \ldots, m_k) \in \mathbb{F}_{N,p_1}$ and $Q(s_1 x/y+m_1, \ldots, s_k x/y+m_k) \in \mathbb{F}_{N,p_3}$, then $\text{Dec}_{sk,pk}(Q(c_1, \ldots, c_k)) = Q(m_1, \ldots, m_t)$.

Remark 8. The requirement that $P(m_1, \ldots, m_k) \in \mathbb{F}_{N,p_1}$ may seem unreasonable since $\mathbb{F}_{N,p_1}$ is not closed under addition. However, one can always choose $p_1$ large enough to guarantee that the scheme is compatible with the requisite polynomials P. For example, if one only needs to work with fractions whose numerators and denominators are bounded (in absolute value) by M, then one simply chooses $p_1$ so that $N=\lfloor\sqrt{(p_3-1)/2}\rfloor >> M$. This creates a "bounded closure."

6. Security Analysis

We present a discussion on the security properties of our construction from at least four perspectives: CPA indistinguishability, an analysis on encryptions of zero, factoring concerns, and an intrinsic hardness of Hensel codes that are meant to violate correctness boundaries.

6.1 Indistinguishability under Chosen Plaintext Attacks (CPA)

We present a variant of the AGCD assumption where the distinguisher is additionally given e, g, g'. For simplicity, we use (e; g; g0)-AGCD to denote the variant of the AGCD problem and (e, g, g')-AGCD(p) to denote its associated distribution.

Definition 7 ((e, g, g')-AGCD). Let u, v, p be primes such that $|u|_{bits} = \lambda$, $|v|_{bits} = \lambda+3$, $|p|_{bits} = \eta$, and $|w'|_{bits} = \eta$ such that $w = (w')^{\gamma/\mu}$, $g = uvpw$ and $g' = pw$. We sample $r, s \leftarrow \mathbb{Z}_{2^{\lambda-1}}$, $q \leftarrow [uv, uvw) \cap \mathbb{Z}$, and $\sigma \leftarrow \mathbb{Z}_{2^{r\eta}}$ and we compute $e = H_g(H_p(\tilde{H}_{u,v}^{-1}(0, t)) + \sigma p)$. Finally, we compute $x = H_g(r+qg')$ and (e, g, g')-AGCD(p) outputs x together with e, g, g'.

Lemma 6. For any message $m \in \mathbb{Z}_{N,p_1}$, we can perfectly simulate $\text{Enc}_{pk, evk}(m)$ by obtaining x, e, g, g' from (e, g, g')-AGCD(p), sampling $t \leftarrow \mathbb{Z}_{2^{\lambda-1}}$, and outputting $c = H_g(xg' + H_g(te+m))$.

Proof Fix $m \in \mathbb{Z}_{N,u}$. We claim that the following simulated ciphertext $c_{sim}$ decrypts to m: $c_{sim} = H_g(te+m) + qg' - kg$, for some integer k. We further simplify to get $c = H_g(te+m) + \alpha g'$, where $\alpha = x - k(g/g')$. It now follows immediately from the proof of correctness (Theorem 1, Eq. 6) that $\text{Dec}_{sk,pk}(c_{sim}) = m$. Furthermore, we observe trivially that the simulated encryptions are distributed identically to the actual encryptions.

Definition 8. Consider the following experiment: a uniform $\eta$-bit prime p is chosen use along with a fixed message m from $\mathbb{Z}_{2^\lambda}$. Then a uniform bit $b \leftarrow \{0,1\}$ is chosen. A distinguisher $\mathcal{D}$ is given g, g' from (e, g, g')-AGCD(p), and then:

If b=0, the distinguisher is given repeated random samples from (e, g, g')-AGCD(p).

If b=1, the distinguisher is given repeated simulations of encryptions of m using samples from (e, g, g')-AGCD(p) in the form $H_g(xg' + H_g(m))$.

The distinguisher outputs a guess b', and succeeds if b'=b. It $\epsilon$-distinguishes if $\Pr[b'=b] = 1/2 + \epsilon$.

Assumption 1. For any probabilistic polynomial-time distinguisher $\mathcal{D}$, the probability that $\mathcal{D}$ is successful in the preceding experiment is negligible. That is, at best, $\mathcal{D}$ $\epsilon$-distinguishes with $\epsilon = \epsilon(\lambda)$ negligible.

Theorem 2. The private-key leveled FHE scheme described in Section 5 is CPA-secure under Assumption 1.

Proof Fix an adversary $\mathcal{A}$ attacking the scheme. Construct an adversary $\mathcal{B}$ as follows: $\mathcal{B}$ is given repeated samples from (unknown) distribution. $\mathcal{B}$ runs $\mathcal{A}$. When $\mathcal{A}$ requests an encryption of m, then $\mathcal{B}$ does: 1) Get a sample x from the given distribution, 2) Return a simulated ciphertext c (dependent on x) to $\mathcal{A}$. When $\mathcal{A}$ outputs its challenge messages $m_0, m_1$ then $\mathcal{B}$ chooses a random bit b and does the exact same thing as above using the message $m_b$. When $\mathcal{A}$ outputs a guess b', then $\mathcal{B}$ outputs 1 if and only if b'=b.

Claim (1). When $\mathcal{B}$ is given samples from distribution (e, g, g')-AGCD(p), then the probability that $\mathcal{B}$ outputs 1 is identical to $\mathcal{A}$'s success probability in the CPA experiment.

Proof(1). This follows since when $\mathcal{B}$ is given samples from distribution (e, g, g')-AGCD, then $\mathcal{A}$'s view is identical to its view in the CPA experiment.

Claim (2). When $\mathcal{B}$ is given random samples from (e, g, g')-AGCD(p), then the probability that $\mathcal{B}$ outputs 1 is 1/2.

Proof(2). This follows since $\mathcal{A}$'s view is independent of b. Indeed, for any message m, $\mathcal{B}$ can perfectly simulate a ciphertext for m using random samples from (e, g, g')-AGCD(p). So, as per Lemma 6, the challenge ciphertext is computationally indistinguishable from a random element of (e, g, g')-AGCD(p), which is independent of m regardless of the choice of b. It follows that $\mathcal{A}$ correctly outputs b'=b with probability exactly 1/2.

By Assumption 1, the difference in the probability that $\mathcal{B}$ outputs 1 when given samples from (e, g, g')-AGCD(p) and the probability that it outputs 1 when given uniform samples is negligible. It follows from this and the above claims that the probability that A succeeds in the CPA experiment is 1/2+negl. This completes the proof.

6.2 Further Discussion of Security

Here we show that, under a particular assumption, ciphertexts are indistinguishable from random elements of $\mathbb{Z}_g$.

Lemma 7. There are $p_1^2 p_2$ distinct encryptions of 0.

Proof. Encryptions of 0 are of the form $\text{Enc}_{pk,evk}(0)$, where $s \leftarrow [0, p_1) \cap \mathbb{Z}$ and $\delta \leftarrow [p_1, p_2, p_1 p_2 p_4) \cap \mathbb{Z}$. We will show that each pair $s, \delta$ yields a unique encryption of 0. To this end, suppose $s \neq s'$ or $\delta \neq \delta' \pmod{p_1 p_2}$. If $H_g(H_g(se) + \delta g') = H_g(H_g(s'e) + \delta' g')$, then we deduce that $s \equiv s' \pmod{g'}$. Since $0 \leq s, s' < g'$, $s = s'$, a contradiction. All that remains is the case where $s = s'$ and $\delta \neq \delta' \pmod{p_1 p_2}$. Again, if $H_g(H_g(se) + \delta g') = H_g(H_g(s'e) + \delta' g')$, then $H_g(se) = H_g(s'e)$ implies $\delta g' - kg = \delta' g' - k'g$, for some $k, k' \in \mathbb{Z}$. Rearranging the equation yields $\delta - \delta' = (k - k') p_1 p_2$, also a contradiction. The result follows from the fact that there are $p_1$ choices for $s$, and $p_1 p_2$ choices for $\delta$.

We now define an experiment in which a distinguisher tries to distinguish between a random subset of $[0; g) \cap \mathbb{Z}$ and a set of encryptions of 0.

Definition 9. Let $\mathcal{D}$ be a probabilistic polynomial-time distinguisher which knows the public-key $pk = (e, g, g')$. A uniform bit $b \leftarrow \{0,1\}$ and a random $k \leq p_1^2 p_2$ are chosen, and then:

If $b = 0$, then $\mathcal{D}$ is given a random subset of $[0, g) \cap \mathbb{Z}$ with $k$ elements.

If $b = 1$, then $\mathcal{D}$ is given a set $k$ of random encryptions of 0.

$\mathcal{D}$ outputs a guess $b' \in \{0,1\}$ and succeeds if $b = b'$. Say $\mathcal{D}$ $\epsilon$-distinguishes if $\Pr[b' = b] = \frac{1}{2} + \epsilon$.

Assumption 2. The probability that $\mathcal{D}$ is successful in the preceding experiment is negligible. That is, $\mathcal{D}$ can only $\epsilon$-distinguish if $\epsilon = \epsilon(\lambda)$ is negligible.

Proposition 5. For a fixed $m \in \mathbb{F}_{N, p_1}$, elements of the set $\text{Enc}_{pk,evk}$ are indistinguishable from random elements of $[0; g) \cap \mathbb{Z}$ under Assumption 2.

Proof. Let $m \in \mathbb{F}_{N, p_1}$, $\text{Enc}_{pk,evk}(m) = \text{Enc}_{pk,evk}(m+0) = \text{Enc}_{pk,evk}(m) + \text{Enc}_{pk,evk}(m+0)$. By Assumption 2, encryptions of 0 are indistinguishable from random elements of $[0; g) \cap \mathbb{Z}$, whence $\text{Enc}_{pk,evk}(m) + \text{Enc}_{pk,evk}(m+0) = \text{Enc}_{pk,evk}(m)$ is indistinguishable from a random element of $[0; g) \cap \mathbb{Z}$

6.3 Factoring

The most obvious threat to our construction is also the easiest to thwart. It is associated with factoring attacks since the public evaluation key evk corresponds to $g$, which is the product of $p_1, \ldots, p_4$. Successfully factoring $g$ leads to a total break of the scheme since decryption only uses the knowledge of $p_1$ and $p_3$ according to Eq. 5. Even a partial factorization of $g$ might lead to a total break of our scheme, as long as $p_1$ and $p_3$ are recovered. The main threat could be provided by some variation ECM factoring method (since $p_4$ in our scheme is not prime) with running time on the size of the smallest prime factor as opposed to the size of $g$. To prevent ECM threats, one must set the size of individual primes to be at least 512 bits and preferably at least 768 bits. Additionally, if $g$ is sufficiently large (e.g., greater than or equal to 4096 bits), index calculus methods such as the Number Field Sieve method will not succeed.

6.4 Hensel Code Problem

We close this section with a proof that an adversary, knowing only $g = p_1, \ldots, p_4$, $g' = p_3 p_4$, and $c = H_g(H_g(x/y) + \delta g')$, cannot deduce $x/y$ using $H_g^{-1}$ or $H_{g'}^{-1}$. Furthermore, the range of the "noise parameter" can be restricted to guarantee that an adversary cannot even deduce the denominatory (a problem we noticed in some simulations).

Proposition 6. If $\alpha = g'$ or $g$, then $\tilde{H}_\alpha^{-1}(H_{g'}(se+m)) \neq m$.

Proof Suppose by way of contradiction that $H_{g'}(se+m) = H_\alpha(m)$.

Let $\alpha = g'$.

If we let $m = x/y$, then we get $H_{g'}((sey+m)/y) = H_{g'}(x/y)$. Since $p_1 \ll p_3, p_4$, $y$ is invertible modulo $g'$, whence $(sey+x)y^{-1} \equiv xy^{-1} \pmod{g'}$. It follows that $se \equiv 0 \pmod{g'}$. Since $s < p_1$, we also have $s$ invertible modulo $(\bmod\, g')$, which means $e \equiv 0 \pmod{g'}$. In particular, we note that $e \equiv 0 \pmod{p_4}$. But, since $e = H_{p_1, p_2}^{-1}(0, s_2) + \delta_e p_4$, this implies $H_{p_1, p_2}^{-1}(0, s_2) \equiv 0 \pmod{p_4}$. Put $H_{p_1, p_2}^{-1}(0, s_2) = x_0/y_0$. Since $s_2 \neq 0$, $x_0 \neq 0$. Moreover, since the inverse of $y_0$ modulo $p_4$ cannot be divisible by $p_4$, we conclude that $x_0 \equiv 0 \pmod{p_4}$. This contradicts $0 < |x_0| \leq \lfloor \sqrt{(p_1 p_2 - 1)/2} \rfloor < p_4$.

Let $\alpha = g$.

Since $g' | g$, $H_{g'}((sey+m)/y) = H_g(x/y)$ implies $H_{g'}((sey+m)/y) = H_{g'}(x/y)$.

The result follows.

Lemma 8. Suppose $\tilde{H}_\alpha^{-1}(H_{g'}(x/y)) = x'/y'$, where $\alpha = g$ or $g'$. If $x \neq x'$ then $y \neq y'$ or $|x - x'| \geq g'$.

Proof Suppose $\alpha = g$. Then $H_{g'}(x/y) = H_{g'}(x'/y')$. We will prove the contrapositive. If $y = y'$ and $|x - x'| < g'$, then we use the fact that $g' | g$ to obtain $|x - x'|_g = 0$. Since $|x - x'|$ is less than $g'$, $x = x'$. The proof for $\alpha = g'$ is analogous.

Proposition 7. Let $x/y \in \mathbb{F}_{N, p_1}$, $N = \lfloor \sqrt{(g'-1)/2} \rfloor$, and $\alpha = g$ or $g'$. If $$s \in \left( \frac{N + |x|}{e|y|}, \frac{g' - N + |x|}{e|y|} \right), \text{ and} \qquad \text{Eq. 8}$$

$$\tilde{H}_\alpha^{-1}\left(H_{g'}\left(se + \frac{x}{y}\right)\right) = \frac{x'}{y'},$$

then $y \neq y'$.

Proof. In light of Lemma 8, it suffices to prove that $x + sey \neq x'$ and $|(x+sey) - x'| < g'$.

If $s > (N + |x|)/(e|y|)$, then $$|x + sey| \geq ||x| - se|y|| > x - (N + |x|) = N.$$

Since $|x'| \leq N$, by definition of $\tilde{H}_\alpha^{-1}$ (MEEA, in particular), we see that $x + \delta p_4 y \neq x'$.

Similarly, if $0 < s < (g' - N - |x|)/(e|y|)$, then:

$$|(x+sey) - x'| \leq |x| + se|y| + N > |x| + (g' - N - |x|) + N = g'.$$

This completes the proof.

7. Practical Considerations

Among several alternative concrete parameter configurations we considered, the one we discuss in this work is not the most efficient in terms of ciphertext expansion. However, it is an instance that works as desired with respect to the homomorphic operations. As mentioned before, the noise growth on addition is still a concern. In our scheme, messages are members of a subset of the rational numbers so if we let two messages $x_1/y_1$ and $x_2/y_2$, be encrypted to two ciphertexts $c_1$ and $c_2$, then $c_1 \cdot c_2$ and $c_1 + c_2$ will decrypt, respectively, to:

$$\frac{x_1 x_2}{y_1 y_2} \text{ and } \frac{x_1 y_2 + x_2 y_1}{y_1 y_2} \qquad \text{Eq. 9}$$

We note that the space taken up by addition is similar to the space taken up by multiplication (in the sense that the scheme admits a similar number of additions and multiplications), and acknowledge that this might be a downside for some applications.

Advantages of Working with Hensel Codes. Although there are some limiting aspects, we want to emphasize some of the advantages in working with Hensel codes. Recall that $\mathcal{P} = \mathbb{F}_{N,p_1}$. Considering that $p_1$ must be at least a 768-bit prime, its corresponding N is a 384-bit number and, thus, the message space will be sufficiently large to include the solutions for most applications that require rational numbers as inputs. For instance, the set of rational numbers $\mathbb{F}_{N,p_1}$ includes integers (negative and positive) up to 384 bits. This is a message space large enough to contemplate a large class of real-world applications. Obviously, the larger $p_1$ is, the larger will be the message space. Perhaps one of the greatest takeaways is that we can merge error-free computation with homomorphic encryption via Hensel codes. As an immediate consequence, we can naturally compute the arithmetic gates addition, subtraction, multiplication, and division as follows: $|c_1+c_2|_g$, $|c_1-c_2|_g$, $|c_1c_2|_g$ and $|c_1/c_2|_g$, respectively. Correctness follows the discussion in Section 5.1. It is clear that addition, subtraction, and multiplication are computed in the natural way modulo g. For all $c_1$, $c_2$ output by Enc or Eval, the division $|c_1/c_2|_g$, will work as long as $\gcd(c_2, g)=1$. One simple way to ensure that division is always defined is to allow an encryption of zero to be public and implement the following division algorithm: Given $c_1$, $c_2$, g and a public encryption of zero $c_z$, generate a uniform $r_c \leftarrow \mathbb{Z}_{2^{\lambda-1}}$ and update $c_2$ as $c_2=r_c c_z+c_2$. If $\gcd(c_2, g)=1$, compute and output $|c_1/c_2|_g$, if not, repeat.

Given any homomorphic encryption that takes positive integers as valid messages, it is not surprising that one could easily provide a way for allowing that scheme to accept rational numbers as inputs. Given a rational number a/b (assumed to be positive, for simplicity), options include: 1) a simple modular encoding with a modulus q>a, b such that you have m=aq+b, 2) CRT with two moduli $q_1$, $q_2$>a, b such that m=$\text{CRT}_{q_1,q_2}$(a, b), or yet 3) any pairing function, such as the Cantor pairing function, in which case we could obtain m=½ (a+b) (a+b+1)+b. None of the above options, along with many other numeric manipulations, preserve operations in the message space. Thus, since Hensel codes create an operation-preserving correspondence between a set of rationals and a set of integers, they are preferable as a tool for modifying existing schemes to take rational inputs.

7.1 Performance

The results presented in Table 1 were generated from experiments conducted with an implementation of our candidate scheme using Python 3.8.5, on a Mac-Book Pro 15-inch, MacOS High Sierra 10.13.6, 2.8 GHz Intel Core i7, 16 GB 1600 MHz DDR3, 500 GB HD. Each runtime (in seconds) presented is the arithmetic mean of 100 runs.

$|p_1|_{bits}=\lambda, |p_2|_{bits}=\lambda+3, |p_3|_{bits}=\eta, |p_4|_{bits}=\eta, |p_5|_{bits}=\mu$ We present practical results using two configurations. First, we set $\rho=\lambda=512$, d=10, which gives $\eta=5120$, $\mu=454653$, $\gamma=461571$, $|p_1|_{bits}=512$, $|p_2|_{bits}=515$, $|p_3|_{bits}=5120$, $|p_4|_{bits}=455672$, $|g'|_{bits}=460791$, and $|g|_{bits}=461818$ (slightly larger than $\gamma$). Second, we set $\rho=\lambda=768$, d=20, which gives $\eta=15360$, $\mu=2927601$, $\gamma=2950275$, $|p_1|_{bits}=768$, $|p_2|_{bits}=771$, $|p_3|_{bits}=15360$, $|p_4|_{bits}=2933708$, $|g'|_{bits}=2949067$, and $|g|_{bits}=2950606$. In Table 1 we display runtime results for the key generation, encryption, and decryption algorithms, and the homomorphic evaluation of the dot product of two 3D vectors.

TABLE 1

Runtime results

| Algorithm | Runtime for $\lambda$ =512; d = 10 | Runtime $\lambda$ = 768; d = 20 |
|---|---|---|
| Key Generation | 184.244738 | 927.6136270000001 |
| Encryption | 0.9383330000000001 | 35.50052400000004 |
| Decryption | 0.0067889999999977135 | 0.09174399999994876 |
| 3D vector dot product | 0.3805450000000121 | 12.849364999999807 |

Hardware Implementation for a Private or Public-Key Leveled FHE Embodiment (FIG. 1)

FIG. 1 is a block diagram 100 of the hardware implementation for a private or public-key leveled Fully Homomorphic Encryption (FHE) embodiment. A source computing device 102 is connected over an electronic network/bus connection 108 to an intermediary computing device 104 and a destination device 106. Likewise, the intermediary computing device 104 and destination computing device 106 are, in turn, connected to each other 104, 106 as well as to the source computing device 102 over the electronic network/bus connection 108. In the embodiment shown in FIG. 1, the source computing device 102 acts as the source of the encrypted data 110 and the source computing device 102 sends the encrypted data 110 over the network/bus connection 108 to the intermediary computing device 104 and/or the destination computing device 106. When the intermediary computing device 104 receives the encrypted data 110 from the source computing device 102, the intermediary computing device 104 may perform homomorphic Hensel Code arithmetic operations (addition, subtraction, multiplication, and/or division) with at least one additional ciphertext to obtain a result ciphertext 110 that the intermediary computing device 104 may then send over the network/bus connection 108 to the destination computing device 106. The destination computing device 106 may decrypt the received encrypted ciphertext 110 to obtain unencrypted data reflecting either the original message if the ciphertext 110 was the original ciphertext sent by the source computing device 102 or an unencrypted result of the arithmetic operations performed by the intermediary computing device 104 if the received ciphertext 110 is a result ciphertext sent by the intermediary computing device 104 after performing homomorphic arithmetic operations with the original ciphertext and at least one additional ciphertext. The destination device 104 generally acts as a final destination for the encrypted data 110 received from the network/bus connection 106 intended for decryption. Generally, communications, including concealed/encrypted communications, are bi-directional such that the source 102, intermediary 104, and destination 106 computing devices may change roles as the encrypted data 110 source 102, intermediary 104, and the encrypted data 110 destination 106 as is necessary to accommodate the transfer of data back and forth between the computing devices 102, 104, 106. Notably, the intermediary computing device 104 does not require knowledge of the secret keys to perform the homomorphic Hensel Code arithmetic operations, so it is likely that the intermediary computing device 104 will be at least computationally isolated from the source 102 and destination 106 computing devices. Additionally, while the computing devices 102, 104, 106 are depicted as separate devices in FIG. 1, the functionality of the source computing device 102, the intermediary 104 and the destination device 106 may be shared on a single computing system/device or among two or more computing devices as it is often desirable to conceal data when transferring data between components of a single device.

Further, as shown in FIG. 1, the source computing device 102 appears to be a laptop computer and the destination computing device 104 appears to be a tablet device and the intermediary computing device appears as a "cloud" that may represent one or several devices connected on the network 108 performing homomorphic arithmetic computations without a need to decrypt to the data 110 to obtain the correct decrypted value for the arithmetic operations. Generally, any computing device capable of communication over any form of electronic network or bus communication platform 106 may be one or more of the source 102, the intermediary 104, and destination 106 computing devices. Additionally, the source 102, intermediary 104 and/or destination 106 computing devices may actually be the same physical computing device communicating over an internal bus connection 108 with itself, but still desiring to encrypt transferred data to ensure that an attacker cannot monitor the internal communications bus 108 to obtain sensitive data communications in an unencrypted format.

Various embodiments may implement the network/bus communications channel 108 using any communications channel 108 capable of transferring electronic data between the source 102, intermediary 104, and destination 106 computing devices. For instance, the network/bus communication connection 108 may be an Internet connection routed over one or more different communications channels during transmission between the source 102, intermediary 104, and destination 106 devices. Likewise, the network/bus communication connection 108 may be an internal communications bus of a computing device, or even the internal bus of a processing or memory storage Integrated Circuit (IC) chip, such as a memory chip or a Central Processing Unit (CPU) chip. The network/bus communication channel 108 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the source 102, intermediary 104, and/or destination 106 computing devices. The source 102, intermediary 104, and/or destination 106 computing devices may each be a computer or computer system, or any other electronic devices device capable of performing the communications and computations of an embodiment. The source 102, intermediary 104, and/or destination 106 devices may include, but are not limited to: a general-purpose computer, a laptop/portable computer, a tablet device, a smart phone, an industrial control computer, a data storage system controller, a CPU, a Graphical Processing Unit (GPU), an Application Specific Integrated Circuit (ASI), and/or a Field Programmable Gate Array (FPGA). Notably, the first 102, second 104, and/or third 106 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Figure 2:
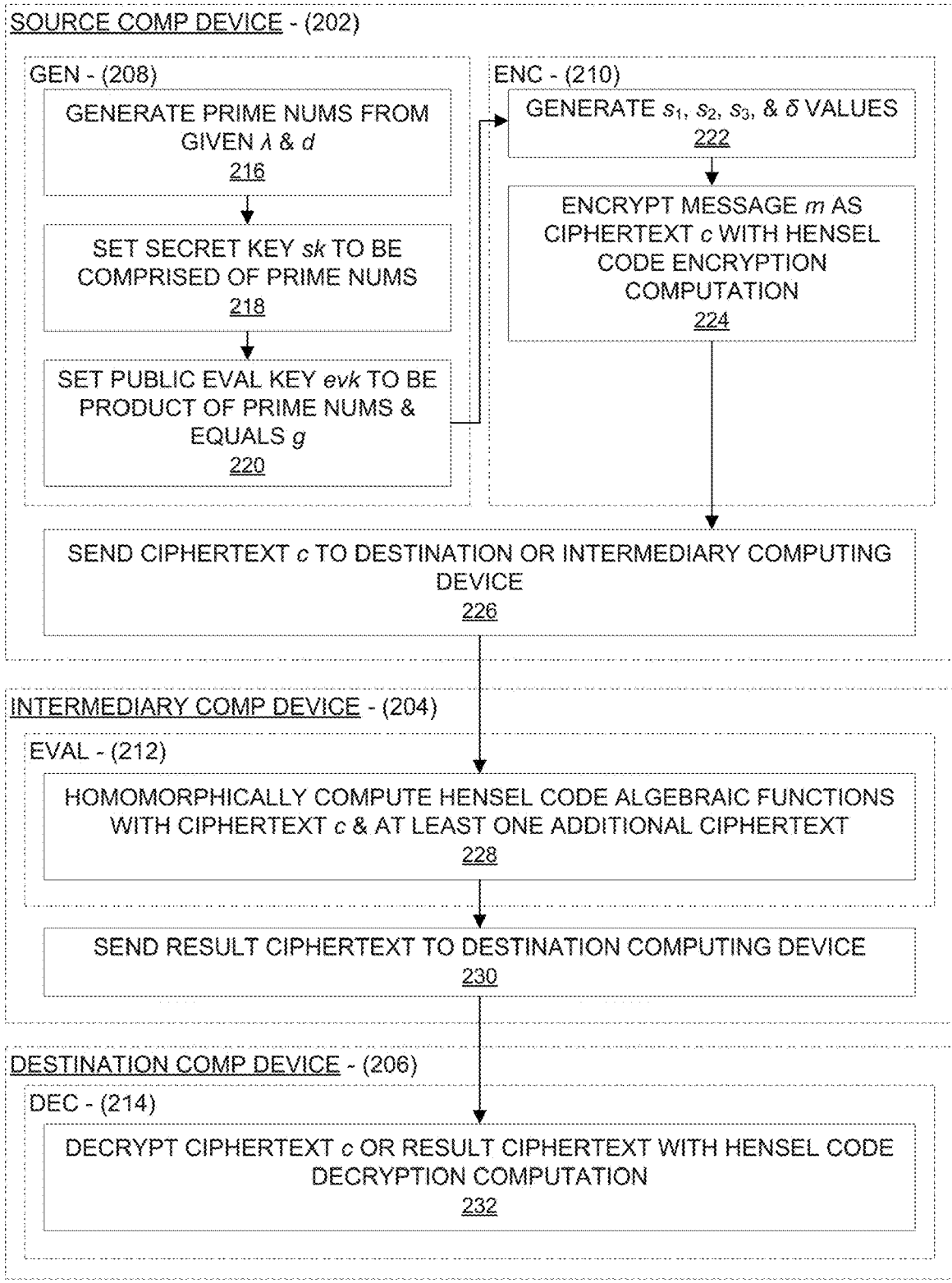
FIG. 2 is a flow chart of operations for a private-key leveled FHE embodiment.

Operational Flow Chart for a Private-Key Leveled FHE Embodiment (FIG. 2)

FIG. 2 is a flow chart 200 of operations for a private-key leveled FHE embodiment. At process 216, the source computing device 202 generates prime numbers $p_1 \ldots p_5$ as a function of provided parameters $\lambda$ and d. Given the parameter $\lambda$ and the parameter d, then $\rho$, $\eta$, $\gamma$, and $\mu$ are defined as follows: $\rho=\lambda$, $\eta=2(d+2)\lambda$, $\mu=\gamma-\eta-2\lambda$, and $$\gamma = \frac{\lambda}{\log_2(\lambda)}(\eta - \rho)^2$$

such that the bit widths are computed as $$|p_1|_{bits} = \rho + 1,$$

$$|p_2|_{bits} = |p_3|_{bits} = \frac{\rho}{2},$$

$$|p_4|_{bits} = \eta,$$

$$|p_5|_{bits} = \mu,$$

and $|g|_{bits}=\gamma$. At process 218, the source computing device 202 sets a secret key sk to be comprised of the prime numbers $p_1 \ldots p_5$ wherein the secret key is known to both of the source computing device 202 and the destination computing device 206 but not to other computing devices, including the intermediary computing device 204. At process 220, the source computing device 202 sets a public evaluation key evk to be equal to a product $(\Pi_{i=1}^{5} p_i)$ of the prime numbers $p_1 \ldots p_5$ wherein the public evaluation key evk also equals a g of Hensel Code g-adic computations $(H_g)$. Processes 216-220 are part of a Gen (generate) 208 subsystem/algorithm that performs the necessary operations to generate the necessary security keys for the encryption operations.

At process 222, the source computing device 206 generates uniform and independent values $s_1$, $s_2$, $s_3$, and $\delta$ as a function of the prime numbers $p_2 \ldots p_4$, the parameter $\lambda$, and the value g such that $s_1 \leftarrow \mathbb{Z}_{2^{\lambda-1}}$, $s_2 \leftarrow \mathbb{Z}_{p_2}$, $s_3 \leftarrow \mathbb{Z}_{p_3}$, and $\delta \leftarrow \mathbb{Z}_{g/p_4}$. At process 224, the source computing device 206 encrypts a message m as ciphertext c in accord with Hensel Code encryption computation $c=|H_g(s_1 \cdot \tilde{H}_{p_1,p_2,p_3}^{-1}(0, s_2, s_3)+\delta_{p_4})|_g$. Processes 222-224 are part of an Enc (encrypt) 210 subsystem/algorithm that performs the necessary operations to encrypt the message m. At process 226, the source computing device 202 sends the ciphertext c to the destination computing device 206 if no homomorphic calculations are desired, or to the intermediary computing device 204 if homomorphic calculations are desired.

The processes 228-230 of the intermediary computing device 204 are not necessary if it is not desired to perform homomorphic calculations with at least one additional ciphertext $c_{additional}$ to obtain a result ciphertext $c_{result}$, in which case the original ciphertext c may simply be sent to the destination computing device 206 for decryption. Assuming homomorphic calculation operations are desired, at process 228, the intermediary computing device 204 homomorphically computes at least one arithmetic function with said ciphertext c and at least one additional ciphertext $c_{additional}$ in accord with Hensel Code arithmetic functions over integers modulo g to obtain a result ciphertext $c_{result}$. The potential arithmetic functions are one or more of addition, subtraction, multiplication, and division. Notably, the intermediary computing device 204 does not have knowledge of the secret key sk, but does have knowledge of the public evaluation key evk that equals the g of the Hensel Code g-adic computations ($H_g$). Process 228 is part of an Eval (evaluate) 212 subsystem/algorithm that performs the necessary operations to perform homomorphic calculations on encrypted data. At process 230, the intermediary computing device 204 sends the result ciphertext $c_{result}$ to the destination computing device 206.

At process 232, the destination computing device 206 decrypts the ciphertext c or the result ciphertext $c_{result}$ into an unencrypted value (message m or the unencrypted calculation result r, as appropriate) in accord with Hensel Code decryption computation $m$ (or $r) = H_{p_1}^{-1}(H_{p_1}(H_{p_4}^{-1}(c)))$. Process 232 is part of an Dec (decrypt) 214 subsystem/algorithm that performs the necessary operations to decrypt encrypted data.

Figure 3:
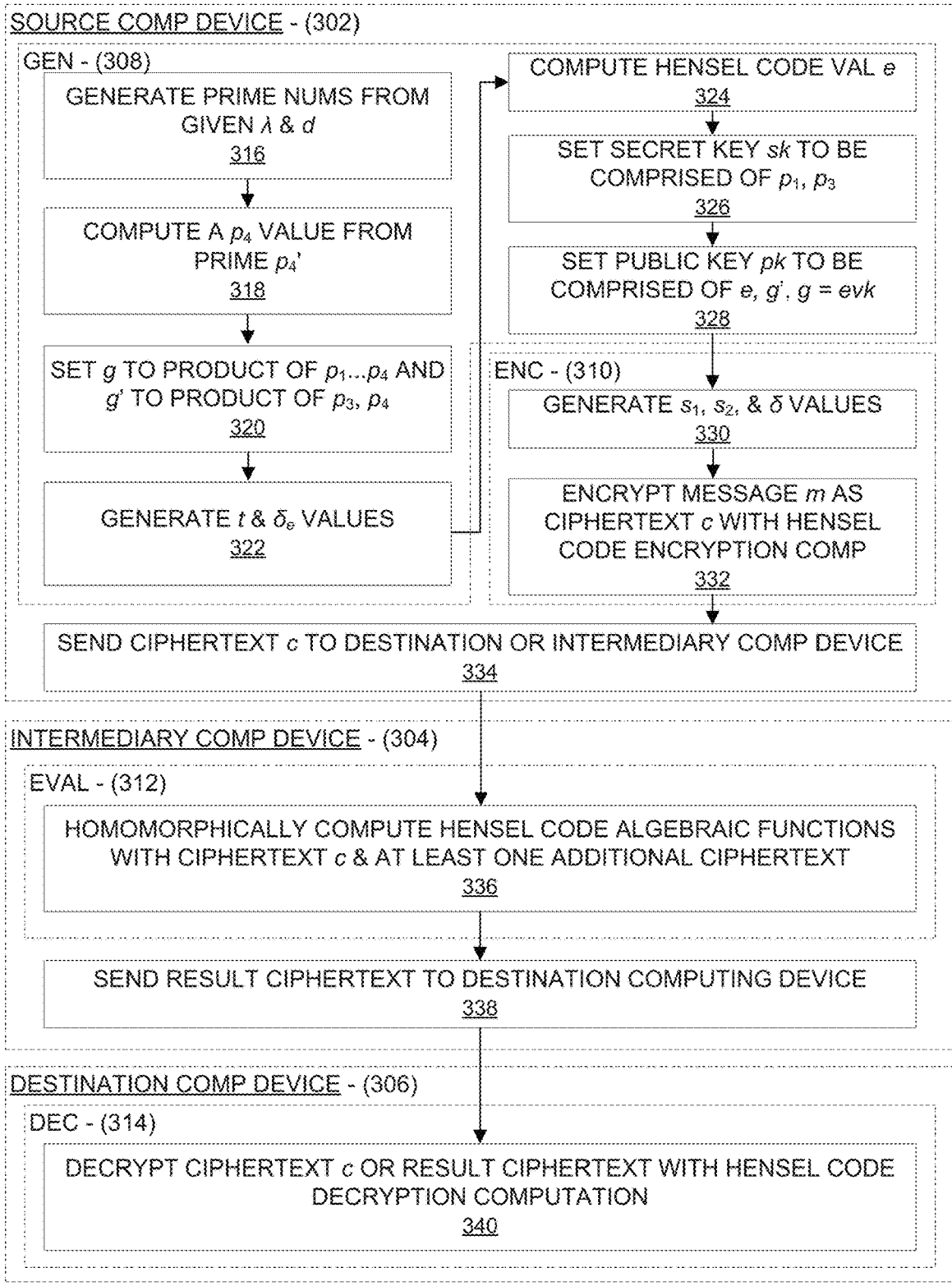
FIG. 3 is a flow chart of operations for a public-key leveled FHE embodiment.

Operational Flow Chart for a Public-Key Leveled FHE Embodiment (FIG. 3)

FIG. 3 is a flow chart 300 of operations for a public-key leveled FHE embodiment. At process 316, the source computing device 302 generates prime numbers $p_1$, $p_2$, $p_3$, and $p'_4$ as a function of provided parameters $\lambda$ and d. Given the parameter $\lambda$ and the parameter d, then $\rho$, $\eta$, $\gamma$, and, $\mu$ are defined as follows: $\rho=\lambda$, $\eta=d\lambda$, $\mu=d^2\lambda \log_2(\lambda)-\eta-2\lambda-3$, and $\gamma=2\eta+(3\lambda)/2+\mu+3$ such that the bit widths are computed as $|p_1|_{bits}=\lambda$, $|p_2|_{bits}=\lambda+3$, $|p_3|_{bits}=\eta$, and $|p'_4|_{bits}=\eta$. At process 318, the source computing device 302 computes a value $p_4$ as a function of the prime number $p'_4$ and the parameters $\lambda$ and d, such that $p_4$ as $p_4=(p'_4)^{\mu/\eta+1}$. At process 320, the source computing device 302 sets a value g of Hensel Code g-adic computations ($H_g$) to a product of the values $p_1$, $p_2$, $p_3$, $p_4$ and a value g' of Hensel Code g'-adic computations ($H_{g'}$) to a product of the values $p_3$, $p_4$. At process 322, the source computing device 302 generates values t and $\delta_e$ as a function of said parameters $\lambda$ and d where the values t and $\delta_e$, are restricted such that $t \leftarrow \mathbb{Z}_{2^{\lambda-1}}$ and $\delta_e \leftarrow \mathbb{Z}_{2^{\lambda\eta}}$. At process 324, the source computing device 302 computes a value e in accord with Hensel Code value e computation $e=H_g(H_{p_3}(\tilde{H}_{p_1,p_2}^{-1}(0, t))+\delta_e p_3)$. At process 326, the source computing device 302 computes a secret key sk that is comprised of the prime numbers $p_1$ and $p_3$ wherein the secret key sk is known to both of the source computing device 302 and the destination computing device 306, but not to other computing devices, including the intermediary computing device 304. At process 328, the source computing device 302 sets a public key pk that is comprised of the values e, g', g=evk. Processes 316-328 are part of a Gen (generate) 308 subsystem/algorithm that performs the necessary operations to generate the necessary security keys for the encryption operations.

At process 330, the source computing device 306 generates uniform and independent values $s_1$, $s_2$ as a function of said parameter $\lambda$, and a value $\delta$ as a function of said values $p_1$, $p_2$, $p_4$ where the values $s_1$, $s_2$ and $\delta_e$, are restricted such that $s_1 \leftarrow \mathbb{Z}_{2^{\lambda-1}}$, $s_2 \leftarrow \mathbb{Z}_{p_2}$, $s_1$, $s_2 \leftarrow \mathbb{Z}_{2^{\lambda\eta}}$ and $\delta \leftarrow [p_1 p_2, p_1 p_2 p_4) \cap \mathbb{Z}$. At process 332, the source computing device 306 encrypts a message m as ciphertext c in accord with Hensel Code encryption computation $c=H_g(H_g(s_1 e+m)+s_2 g'+\delta(g')^2)$. Processes 330-332 are part of an Enc (encrypt) 310 subsystem/algorithm that performs the necessary operations to encrypt the message m. At process 334, the source computing device 302 sends the ciphertext c to the destination computing device 306 if no homomorphic calculations are desired, or to the intermediary computing device 304 if homomorphic calculations are desired.

The processes 336-338 of the intermediary computing device 304 are not necessary if it is not desired to perform homomorphic calculations with at least one additional ciphertext $c_{additional}$ to obtain a result ciphertext $c_{result}$, in which case the original ciphertext c may simply be sent to the destination computing device 306 for decryption. Assuming homomorphic calculation operations are desired, at process 336, the intermediary computing device 304 homomorphically computes at least one arithmetic function with said ciphertext c and at least one additional ciphertext $c_{additional}$ in accord with Hensel Code arithmetic functions over integers modulo g to obtain a result ciphertext $c_{result}$. The potential arithmetic functions are one or more of addition, subtraction, multiplication, and division. Notably, the intermediary computing device 304 does not have knowledge of the secret key sk, but does have knowledge of the public key pk that includes the g of the Hensel Code g-adic computations ($H_g$). Process 336 is part of an Eval (evaluate) 312 subsystem/algorithm that performs the necessary operations to perform homomorphic calculations on encrypted data. At process 3380, the intermediary computing device 304 sends the result ciphertext $c_{result}$ to the destination computing device 306.

At process 340, the destination computing device 306 decrypts the ciphertext c or the result ciphertext $c_{result}$ into an unencrypted value (message m or the unencrypted calculation result r, as appropriate) in accord with Hensel Code decryption computation $m$ (or $r) = H_{p_1}^{-1}(H_{p_1}(H_{p_4}^{-1}(c)))$. Process 340 is part of an Dec (decrypt) 314 subsystem/algorithm that performs the necessary operations to decrypt encrypted data.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A method for private-key Fully Homomorphic Encryption (FHE) communication of a message m between a source computing device and a destination computing device, the method comprising:
- generating by said source computing device prime numbers $p_1 \ldots p_5$ as a function of provided parameters $\lambda$ and d;
- setting by said source computing device a secret key sk to be comprised of said prime numbers $p_1 \ldots p_5$ wherein said secret key is known to both of said source computing device and said destination computing device but not to other computing devices;
- setting by said source computing device a public evaluation key evk to be equal to a product $(\Pi_{i=1}^5 p_i)$ of said prime numbers $p_1 \ldots p_5$ wherein said evk also equals a g of Hensel Code g-adic computations ($H_g$);
- generating by said source computing device values $s_1, s_2, s_3$, and $\delta$ as a function of said prime numbers $p_2 \ldots p_4$, said parameter $\lambda$, and said value g;
- encrypting by said source computing device said message m as ciphertext c in accord with Hensel Code encryption computation $c = |H_g(s_1 \cdot \tilde{H}_{p_1,p_2,p_3}^{-1}(0, s_2, s_3) + \delta p_4)|_g$;
- sending by said source computing device said ciphertext c to said destination computing device; and
- decrypting by said destination computing device said ciphertext c back into said message m in accord with Hensel Code decryption computation $m = H_{p_1}^{-1}(H_{p_1}(H_{p_4}^{-1}(c)))$.

2. The method of claim 1:
- wherein said process of sending by said source computing device said ciphertext c to said destination computing device comprises sending an original ciphertext c to an intermediary computing device;
- wherein said intermediary computing device does not have knowledge of said secret key sk, but does have knowledge of said public evaluation key evk that equals said g of said Hensel Code g-adic computations ($H_g$);
- wherein the method of claim 1 further comprises:
  - homomorphically computing by said intermediary computing device at least one arithmetic function with said original ciphertext c and at least one additional ciphertext $c_{additional}$ in accord with Hensel Code arithmetic functions over integers modulo g to obtain a modified ciphertext c; and
  - sending by said intermediary computing device said modified ciphertext c in place of said original ciphertext c to said destination computing device; and
- wherein said process of decrypting by said destination computing device said modified ciphertext c back into said message m comprises decrypting said modified ciphertext c to obtain a result r equal to an unencrypted computation of said arithmetic functions homomorphically performed as said Hensel code arithmetic functions with said original ciphertext c and said at least one additional ciphertext $c_{additional}$.

3. The method of claim 1 further comprising:
- computing by said source computing device values $\rho, \eta, \gamma$, and $\mu$ as functions of said parameters $\lambda$ and d such that $\rho = \lambda$, $\eta = 2(d+2)\lambda$, $\mu = \gamma - \eta - 2\lambda$, and $$\gamma = \frac{\lambda}{\log_2(\lambda)}(\eta - \rho)^2;$$

and
- computing by said source computing device bit widths as functions of said values $\rho, \eta, \gamma$, and $\mu$ and said parameters $\lambda$ and d such that $$|p_1|_{bits} = \rho + 1,$$
$$|p_2|_{bits} = |p_3|_{bits} = \frac{\rho}{2},$$
$$|p_4|_{bits} = \eta,$$
$$|p_5|_{bits} = \mu,$$

and $$|g|_{bits} = \gamma;$$

and
- wherein said values $s_1, s_2, s_3$, and $\delta$ are restricted such that $s_1 \leftarrow \mathbb{Z}_{2^{\lambda-1}}$, $s_2 \leftarrow \mathbb{Z}_{p_2}$, $s_3 \leftarrow \mathbb{Z}_{p_3}$, and $\delta \leftarrow \mathbb{Z}_{g/p_4}$.

4. The method of claim 1 wherein said arithmetic functions are at least one of group of arithmetic functions chosen from: addition, subtraction, multiplication, and division.

5. A private-key leveled Fully Homomorphic Encryption (FHE) system that communicates a message m between a source computing device and a destination computing device, the private-key leveled FHE system comprising:
- said source computing device, wherein said source computing device is configured to perform steps comprising:
  - generating device prime numbers $p_1 \ldots p_5$ as a function of provided parameters $\lambda$ and d, sets a secret key sk to be comprised of said prime numbers $p_1 \ldots p_5$ wherein said secret key is known to both of said source computing device and said destination computing device but not to other computing devices, sets a public evaluation key evk to be equal to a product $(\Pi_{i=1}^5 p_i)$ of said prime numbers $p_1 \ldots p_5$ wherein said evk also equals a g of Hensel Code g-adic computations ($H_g$);
  - generating device values $s_1, s_2, s_3$, and $\delta$ as a function of said prime numbers $p_2 \ldots p_4$, said parameter $\lambda$, and said value g, encrypts said message m as ciphertext c in accord with Hensel Code encryption computation $c = |H_g(s_1 \cdot \tilde{H}_{p_1,p_2,p_3}^{-1}(0, s_2, s_3) + \delta p_4)|_g$;
  - sending said ciphertext c to said destination computing device; and
- said destination computing device, wherein said destination computing device further performs steps comprising:
  - decrypting said ciphertext c back into said message m in accord with Hensel Code decryption computation $m = H_{p_1}^{-1}(H_{p_1}(H_{p_4}^{-1}(c)))$.

6. The private-key leveled FHE system of claim 5:
- wherein said private-key leveled FHE system further comprises an intermediary computing device;
- wherein said source computing device sends said ciphertext c to said intermediary computing device, wherein said ciphertext c is an original ciphertext c;
- wherein said intermediary computing device does not have knowledge of said secret key sk, but does have knowledge of said public evaluation key evk that equals said g of said Hensel Code g-adic computations ($H_g$);

wherein said intermediary computing device is configured to perform steps comprising:
  homomorphically computing at least one arithmetic function with said original ciphertext c and at least one additional ciphertext $c_{additional}$ in accord with Hensel Code arithmetic functions over integers modulo g to obtain a modified ciphertext c; and
  sending said modified ciphertext c in place of said original ciphertext c to said destination computing device; and
wherein said destination computing device decrypts said modified ciphertext c to obtain a result r equal to an unencrypted computation of said arithmetic functions homomorphically performed as said Hensel code arithmetic functions with said original ciphertext c and said at least one additional ciphertext $c_{additional}$.

7. The private-key leveled FHE system of claim 5, wherein said source computing device is further configured to perform steps comprising:
  computing values $\rho$, $\eta$, $\gamma$, and $\mu$ as functions of said parameters $\lambda$ and d such that $\rho=\lambda$, $\eta=2(d+2)\lambda$, $\mu=\gamma-\eta-2\lambda$, and $$\gamma = \frac{\lambda}{\log_2(\lambda)}(\eta - \rho)^2;$$

computing device bit widths as functions of said values $\rho$, $\eta$, $\gamma$, and $\mu$ and said parameters $\lambda$ and d such that $$|p_1|_{bits} = \rho + 1,$$

$$|p_2|_{bits} = |p_3|_{bits} = \frac{\rho}{2},$$

$$|p_4|_{bits} = \eta,$$

$$|p_5|_{bits} = \mu,$$

$$|g|_{bits} = \gamma;$$

and restricting said values $s_1$, $s_2$, $s_3$, and $\delta$ such that $s_1 \leftarrow \mathbb{Z}_{2^{\lambda-1}}$, $s_2 \leftarrow \mathbb{Z}_{p_2}$, $s_3 \leftarrow \mathbb{Z}_{p_3}$, and $\delta \leftarrow \mathbb{Z}_{g/p_4}$.

8. The private-key leveled FHE system of claim 5 wherein said arithmetic functions are at least one of group of arithmetic functions chosen from: addition, subtraction, multiplication, and division.

* * * * *